United States Patent
Komori et al.

(10) Patent No.: US 12,021,413 B2
(45) Date of Patent: Jun. 25, 2024

(54) ROTATING ELECTRICAL MACHINE

(71) Applicant: Mitsubishi Electric Corporation, Tokyo (JP)

(72) Inventors: Kengo Komori, Tokyo (JP); Kosho Yamane, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 239 days.

(21) Appl. No.: 17/778,860

(22) PCT Filed: Feb. 7, 2020

(86) PCT No.: PCT/JP2020/004861
§ 371 (c)(1),
(2) Date: May 23, 2022

(87) PCT Pub. No.: WO2021/157061
PCT Pub. Date: Aug. 12, 2021

(65) Prior Publication Data
US 2022/0416595 A1 Dec. 29, 2022

(51) Int. Cl.
*H02K 1/27* (2022.01)

(52) U.S. Cl.
CPC ..................... *H02K 1/27* (2013.01)

(58) Field of Classification Search
CPC .... H02K 1/27; H02K 2213/03; H02K 1/2766; H02K 1/28; Y02T 10/64
See application file for complete search history.

(56) References Cited

U.S. PATENT DOCUMENTS

| | | | |
|---|---|---|---|
| 2010/0013350 A1* | 1/2010 | Fu | H02K 1/28 310/216.001 |
| 2013/0020898 A1* | 1/2013 | Ryu | H02K 1/28 310/156.56 |
| 2019/0252936 A1* | 8/2019 | Okamoto | H02K 1/28 |

FOREIGN PATENT DOCUMENTS

| | | |
|---|---|---|
| JP | 2009-225519 A | 10/2009 |
| JP | 2012-147597 A | 8/2012 |
| JP | 2015-61327 A | 3/2015 |
| JP | 2015-220846 A | 12/2015 |

OTHER PUBLICATIONS

International Search Report and Written Opinion mailed on Apr. 14, 2020, received for PCT Application PCT/JP2020/004861, Filed on Feb. 7, 2020, 8 pages including English Translation.

* cited by examiner

*Primary Examiner* — Thomas Truong
(74) *Attorney, Agent, or Firm* — XSENSUS LLP

(57) ABSTRACT

The rotating electrical machine includes a rotor that has a rotor core, a key portion formed protruding in a radial direction from an inner peripheral face of the rotor core, a stress relaxing groove, which is provided at both ends of the key portion and is formed recessed farther to a radial direction outer side than the inner peripheral face of the rotor core, and a multiple of balancing holes provided one each between each pair of a multiple of magnetic poles of the rotor core, wherein lengths from a center of the rotor core to a center of each of the multiple of balancing holes are such that a length of a first straight line that passes through a center of the key portion is less than a length of an nth straight line that intersects with the first straight line vertically.

10 Claims, 27 Drawing Sheets

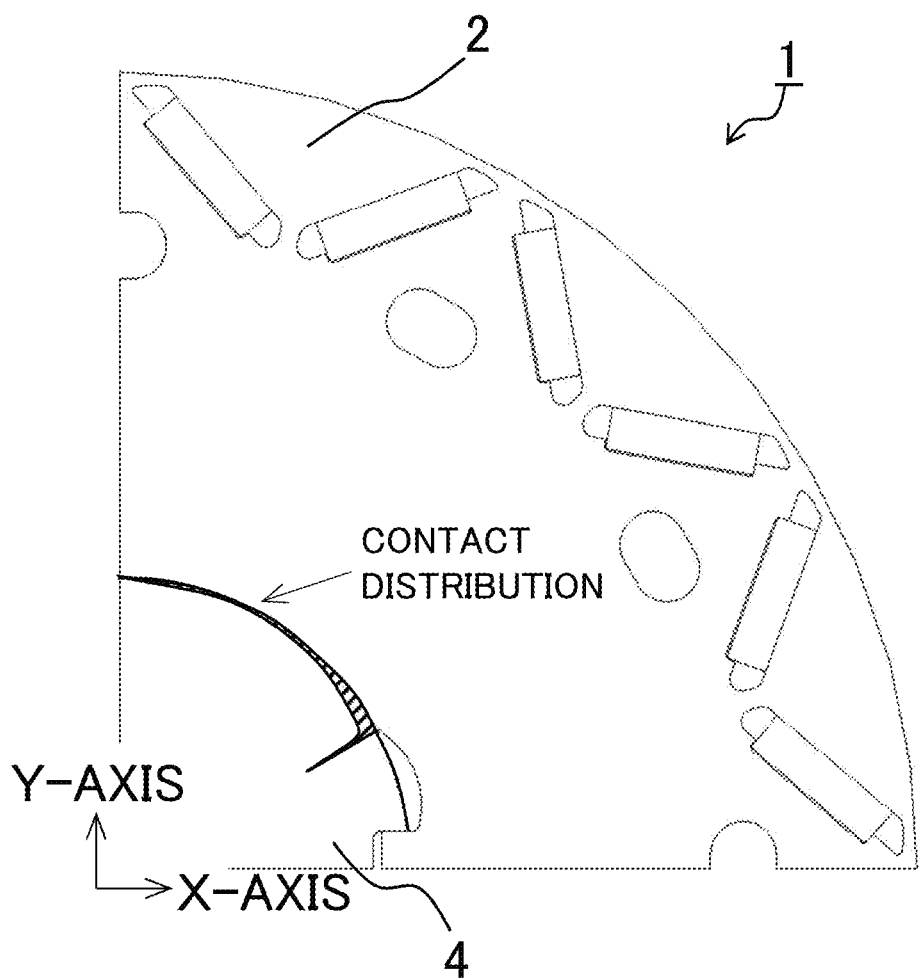

FIG.11A

|  | MAXIMUM PRINCIPAL STRESS[MPa] | | |
|---|---|---|---|
|  | FIRST COMPARATIVE EXAMPLE | SECOND COMPARATIVE EXAMPLE | FIRST EMBODIMENT |
| 271B | 149.1 | 157.2 | 155.9 |
| 272B | 149.4 | 158.1 | 157.2 |
| 273B | 151.0 | 152.0 | 153.9 |
| 274B | 150.3 | 154.8 | 156.0 |
| 275B | 157.2 | 142.5 | 147.6 |
| 276B | 156.2 | 144.0 | 149.0 |
| STANDARD DEVIATION | 3.25 | 6.12 | 3.67 |

FIG.11B

|  | THIRD COMPARATIVE EXAMPLE | FOURTH COMPARATIVE EXAMPLE | FIRST EMBODIMENT |
|---|---|---|---|
| RADIAL DIRECTION CONTACT FORCE[N] | 3282.6 | 3567.4 | 3582.6 |

FIG.13

| | MAXIMUM PRINCIPAL STRESS [MPa] | | | |
|---|---|---|---|---|
| | FIRST VARIATION | SECOND VARIATION | THIRD VARIATION | SECOND COMPARATIVE EXAMPLE |
| 271B | 156.4 | 156.5 | 157.1 | 157.2 |
| 272B | <u>156.6</u> | <u>157.5</u> | <u>157.7</u> | <u>158.1</u> |
| 273B | 152.5 | 153.0 | 153.5 | 152.0 |
| 274B | 153.5 | 155.6 | 155.8 | 154.8 |
| 275B | 148.4 | 144.6 | 144.1 | 142.5 |
| 276B | 150.2 | 146.4 | 146.1 | 144.0 |

FIG.17A

| | MAXIMUM PRINCIPAL STRESS [MPa] | | | |
|---|---|---|---|---|
| | FIRST COMPARATIVE EXAMPLE | SECOND COMPARATIVE EXAMPLE | FIRST EMBODIMENT | SECOND EMBODIMENT |
| 271B | 149.1 | 157.2 | 155.9 | 154.5 |
| 272B | 149.4 | 158.1 | 157.2 | 155.1 |
| 273B | 151.0 | 152.0 | 153.9 | 157.3 |
| 274B | 150.3 | 154.8 | 156.0 | 157.8 |
| 275B | 157.2 | 142.5 | 147.6 | 157.2 |
| 276B | 156.2 | 144.0 | 149.0 | 157.0 |
| STANDARD DEVIATION | 3.25 | 6.12 | 3.67 | 1.23 |

FIG.17B

|  | THIRD COMPARATIVE EXAMPLE | FOURTH COMPARATIVE EXAMPLE | FIRST EMBODIMENT | SECOND EMBODIMENT |
|---|---|---|---|---|
| RADIAL DIRECTION CONTACT FORCE[N] | 3282.6 | 3567.4 | 3582.6 | 3536.7 |

ROTATING ELECTRICAL MACHINE

CROSS-REFERENCE TO RELATED APPLICATION

The present application is based on PCT filing PCT/JP2020/004861, filed Feb. 7, 2020, the entire contents of which are incorporated herein by reference.

TECHNICAL FIELD

The present application relates to a rotating electrical machine.

BACKGROUND ART

The following two structures have been employed to date as structures that cause torque to be efficiently transmitted between a rotor core and a shaft of a rotating electrical machine. The first is a key structure wherein positioning is carried out by causing a recessed portion (hereafter referred to as a groove portion) provided in an outer peripheral face of the shaft to fit over a protruding portion (hereafter referred to as a key portion) protruding to an inner peripheral side from an inner peripheral face of the rotor core. The second is a structure wherein the inner peripheral face of the rotor core and the outer peripheral face of the shaft are in an interference fit, and torque is caused to be transmitted by frictional force of a contact portion.

Also, a magnet-embedded type of rotating electrical machine is such that stress concentration occurs in a multiple of small regions (bridge portions) sandwiched between the outer peripheral face of the rotor core and a magnet insertion hole due to an effect of centrifugal force. When a key portion is provided in the rotor core, there is a problem in that stress in the multiple of bridge portions becomes uneven due to the effect of centrifugal force acting on the key portion. To date, the following technologies have been disclosed as structures that reduce stress concentration.

For example, a rotor of an existing rotating electrical machine disclosed in Patent Document 1 is a rotor having a multiple of permanent magnets configuring magnetic poles, and it has been proposed that a rotor core is of a structure having a key portion, which protrudes to a radial direction inner side from an inner peripheral face of the rotor core, and a recessed portion (a balancing groove), which is provided at each predetermined angle in a circumferential direction of the rotor core with the key portion as a starting point, and is recessed farther to a radial direction outer side than the inner peripheral face of the rotor core.

Also, it has been proposed that an existing rotating electrical machine disclosed in, for example, Patent Document 2 is of a structure wherein a triangular hole accompanying a ridge that extends to a rotor outer peripheral face radial direction side is provided farther to a rotor core radial direction inner side than a permanent magnet in a rotor core having a so-called key structure.

CITATION LIST

Patent Literature

Patent Document 1: JP-A-2015-220846
Patent Document 2: JP-A-2015-061327

SUMMARY OF INVENTION

Technical Problem

However, the aforementioned Patent Document 1 is such that a structure wherein bridge portion imbalance is reduced when the rotor core of the rotating electrical machine rotates at an extremely high speed does not take an effect of a stress relaxing groove into consideration, and when a stress relaxing groove is provided, it is necessary to take the effect of the groove into consideration in order to more efficiently eliminate imbalance. Also, the structure shown in Patent Document 1 is such that imbalance caused by centrifugal force acting on the key portion is caused to further increase.

Also, according to the aforementioned Patent Document 2, a structure is such that torque is transmitted by a key portion of the rotor core and a recessed portion of a shaft being fitted together, and torque can be transmitted even at a time of high speed rotation, but restricting rigid body imbalance caused by eccentricity is a target, and restricting imbalance when there is distortion is not a target. Also, it is necessary to cause the ridge inside the triangular hole to rotate once before cutting a tip.

Because of this, there is an existing problem in that when the rotor of a rotating electrical machine rotates at an extremely high speed, rotor distortion and stress imbalance occur, and durability of the rotating electrical machine decreases.

The present application discloses technology for resolving the aforementioned kinds of problem, and has an object of obtaining a rotating electrical machine such that rotor distortion and stress imbalance can be efficiently restricted, and durability increases.

Solution to Problem

A rotating electrical machine disclosed in the present application is characterized by including a stator, and a rotor that has a rotor core disposed on an inner side of the stator, a key portion formed protruding in a radial direction from an inner peripheral face of the rotor core, a stress relaxing groove, which is provided at both ends of the key portion and is formed recessed farther to a radial direction outer side than the inner peripheral face of the rotor core, and a multiple of balancing holes provided one each between each pair of a multiple of magnetic poles of the rotor core, wherein lengths from a center of the rotor core to a center of each of the multiple of balancing holes are such that a length of a first straight line that passes through a center of the key portion is less than a length of an nth straight line that intersects with the first straight line vertically (note that natural number n>1).

Advantageous Effects of Invention

According to the rotating electrical machine disclosed in the present application, a rotating electrical machine such that rotor distortion and stress imbalance can be efficiently restricted, and durability increases, can be obtained.

BRIEF DESCRIPTION OF DRAWINGS

FIG. 3 is a plan view wherein FIG. 2 is partially enlarged.

FIG. 9B is a plan view showing a distribution of contact with a shaft when the rotor shown in FIG. 9A is rotating.

FIG. 11A is a drawing wherein stress in the rotor of the rotating electrical machine according to the first embodiment and in the rotors of the first comparative example and the second comparative example is compared.

FIG. 11B is a drawing wherein radial direction contact force in the rotor of the rotating electrical machine according to the first embodiment and in the rotors of the third comparative example and the fourth comparative example is compared.

FIG. 13 is a drawing that compares stress acting on outer peripheral bridge portions in the rotor of the first variation, the second variation, and the third variation of the rotating electrical machine according to the first embodiment, and in the rotor of the second comparative example.

FIG. 17A is a drawing that compares stress acting on the rotor of the rotating electrical machine according to the second embodiment and on the rotor of the first comparative example, the second comparative example, and the first embodiment.

FIG. 17B is a drawing that compares a radial direction contact force in the rotor of the rotating electrical machine according to the second embodiment and in the rotor of the third comparative example, the fourth comparative example, and the first embodiment.

DESCRIPTION OF EMBODIMENTS

Figure 1:
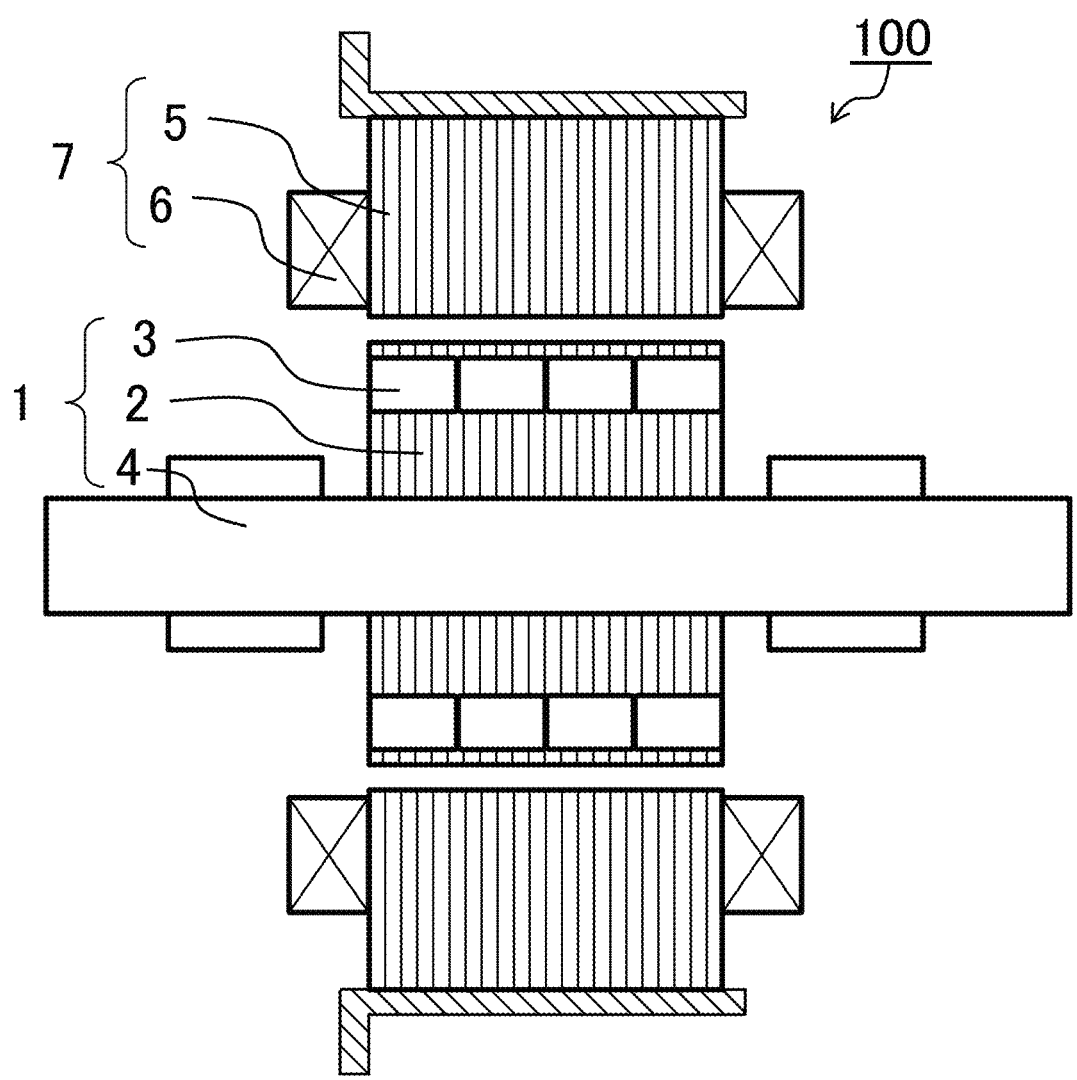
FIG. 1 is a longitudinal sectional view schematically showing a rotating electrical machine according to a first embodiment.

Hereafter, a rotating electrical machine according to a first embodiment will be described, based on the drawings.

In the drawings, identical reference signs indicate identical or corresponding portions.

First Embodiment

FIG. 1 is a longitudinal sectional view schematically showing a rotating electrical machine according to a first embodiment. In FIG. 1, a rotating electrical machine 100 includes a stator 7 and a rotor 1, and the rotor 1 includes a rotor core 2, a permanent magnet 3 embedded in the rotor core 2, and a shaft 4 that penetrates an inner peripheral portion of the rotor core 2. In the first embodiment, the permanent magnet 3 is divided into multiple pieces in an axial direction. The rotor core 2 and the shaft 4 are fitted together via press fitting, shrink fitting, or a key structure provided on an inner periphery of the rotor core 2 and an outer periphery of the shaft 4. Also, the stator includes a stator core 5 wherein a multiple of steel plates are stacked in the axial direction, and a coil 6 wound around the stator core 5. A center of rotation of the stator 7 and a center of mass coincide, and a balance adjusting plate or the like may be added.

Figure 2:
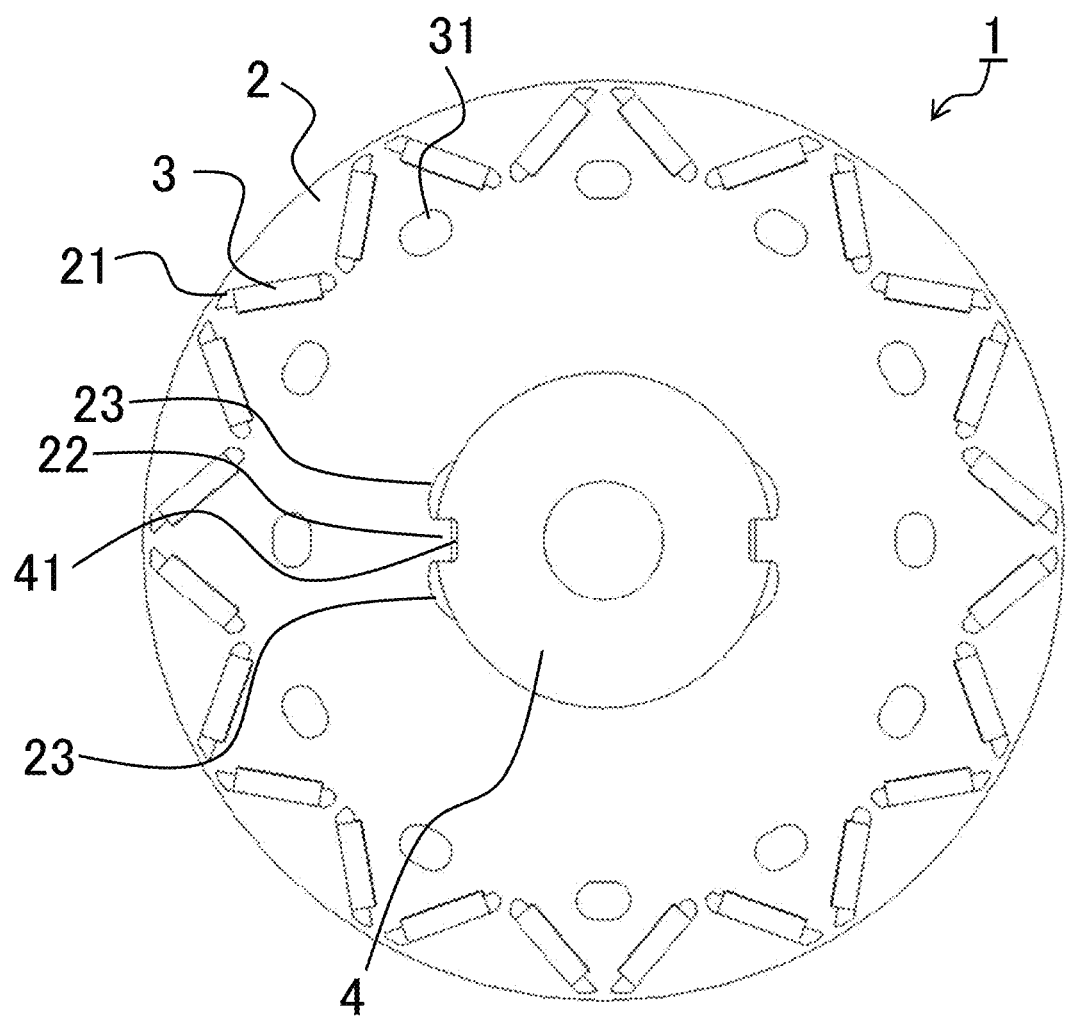
FIG. 2 is a plan view showing a rotor of the rotating electrical machine according to the first embodiment.

FIG. 2 is a plan view showing the rotor of the rotating electrical machine according to the first embodiment. In FIG. 2, 24 magnet insertion holes 21 are disposed in the rotor core 2, and 24 permanent magnets 3 are embedded in the magnet insertion holes 21. Two permanent magnets 3 provided in the magnet insertion holes 21 form one set, and the permanent magnets 3 are disposed in 12 V-shaped sets in a state extending from a central side of the shaft 4 toward an outer peripheral side. One magnetic pole is configured of two magnet insertion holes 21 and two permanent magnets 3 disposed in a V-shape, and 12 magnetic poles are disposed aligned in a circumferential direction. Also, a balancing hole 31 is provided between magnetic poles.

The shaft 4 is disposed in an inner peripheral portion of the rotor core 2. In order to cause torque to be efficiently transmitted between the rotor core 2 and the shaft 4, a key portion 22 that protrudes to a radial direction inner side from an inner peripheral face of the rotor core 2 is provided in the rotor core 2, and a key groove portion 41 that fits together with the key portion 22 on an outer peripheral face of the shaft 4 is provided in the shaft 4. The key portion 22 and the key groove portion 41 form a key structure, and the key structure is provided in two places opposed at 180°.

Figure 3:
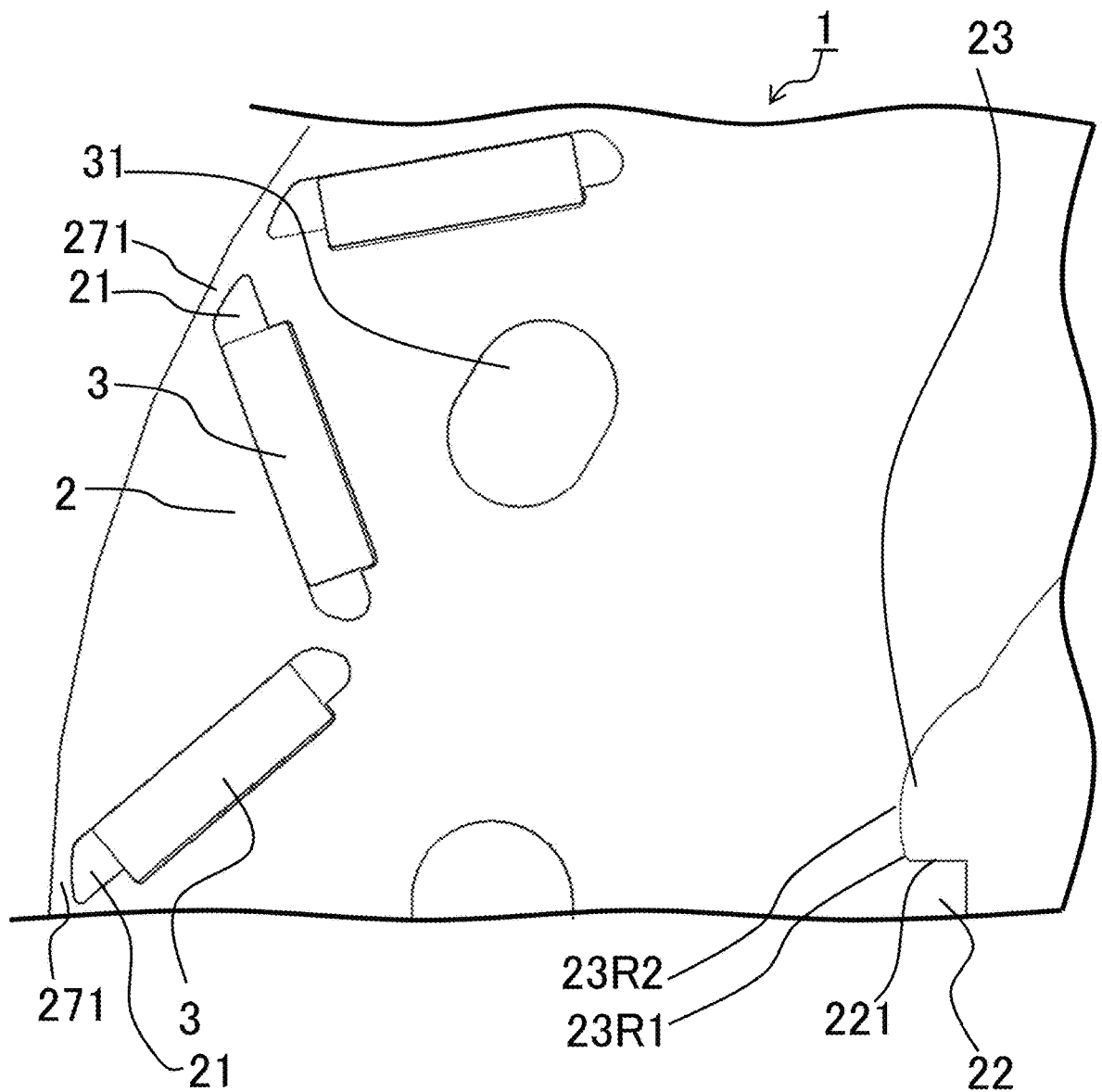

Next, an inner peripheral structure of the rotor core 2 will be described. FIG. 3 is a plan view wherein FIG. 2 is partially enlarged. Referring to FIG. 3, structures of the key portion 22 and an inner peripheral portion of the rotor core 2 of the rotating electrical machine 100 according to the first embodiment will be described. The shaft 4 is omitted from FIG. 3.

In order to relax stress concentration occurring in the key portion 22 due to circumferential direction tensile stress, a stress relaxing groove 23, which is connected to an outer peripheral side of a key side face 221 and is recessed in a direction away from the outer peripheral face of the shaft 4, is provided at both ends of the key portion 22 in the inner peripheral face of the rotor core 2.

The stress relaxing groove 23 according to the first embodiment has a first arc 23R1, which is connected to the outer peripheral side of the key side face 221, and a second arc 23R2, which is connected smoothly with the first arc 23R1 and extends on the inner peripheral face of the rotor core 2.

Also, in order to restrict a distortion imbalance and a stress imbalance between an outer peripheral bridge portion 271, configured sandwiched between the magnet insertion hole 21 and an outer peripheral face of the rotor core 2, and the rotor core 2 at a time of high speed rotation, the balancing hole 31, which is a through hole for reducing weight and reducing stress acting on the magnet insertion hole 21, is provided between neighboring magnetic poles.

Figure 4:
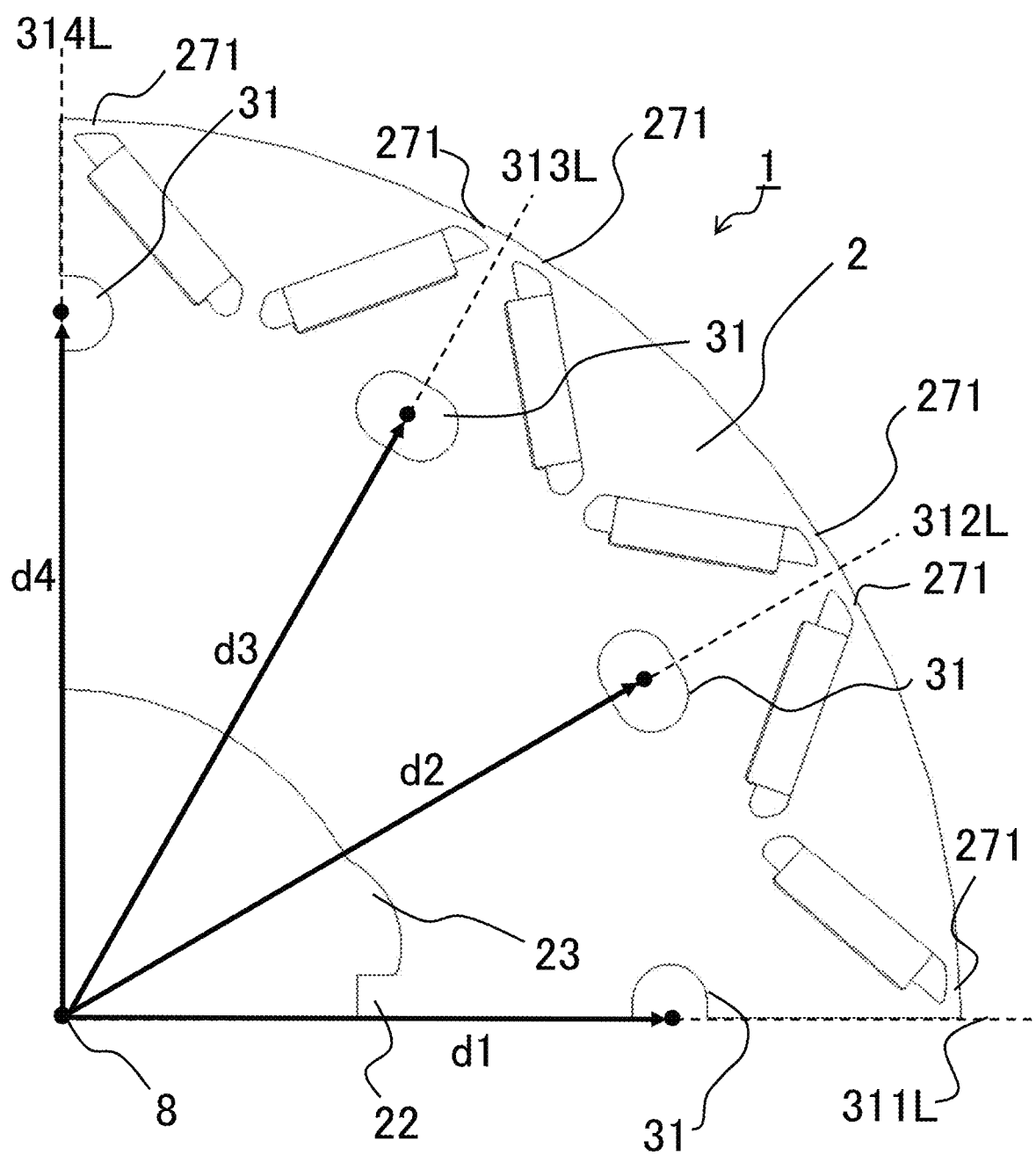
FIG. 4 is a plan view for describing an installation position of a balancing hole in the rotor of the rotating electrical machine according to the first embodiment.

Next, an installation position of the balancing hole 31 in the rotor 1 of the rotating electrical machine 100 according to the first embodiment will be described. FIG. 4 is a plan view for describing the installation position of the balancing hole in the rotor of the rotating electrical machine according to the first embodiment. In FIG. 4, only one-quarter of the rotor 1 of the rotating electrical machine 100 according to the first embodiment is shown, and the shaft 4 is omitted.

In FIG. 4, a half-line that has a center of the rotor core 2 as a starting point 8, passes through a center of the key portion 22, thereby dividing the key portion 22 into two equal portions, and passes through the balancing hole 31 is defined as a first balancing hole central line 311L, and is indicated by a dashed line. Also, a half-line that has the center of the rotor core 2 as the starting point 8, and vertically intersects with the first balancing hole central line 311L, is defined as a fourth balancing hole central line 314L, and is indicated by a dashed line. Furthermore, half-lines that have the center of the rotor core 2 as the starting point 8, and pass through centers of the balancing holes 31 existing as far as the fourth balancing hole central line 314L looking in the circumferential direction from the first balancing hole central line 311L, are defined as a second balancing hole central line 312L and a third balancing hole central line 313L respectively, and are indicated by dashed lines.

As shown in FIG. 4, the rotor 1 of the rotating electrical machine 100 according to the first embodiment is such that, with the center of the rotor core 2 as the starting point 8, straight lines as far as the center of the balancing hole 31 on the first balancing hole central line 311L, the second balancing hole central line 312L, the third balancing hole central line 313L, and the fourth balancing hole central line 314L are defined as d1, d2, d3, and d4 respectively, and the balancing holes 31 are disposed in such a way that Expression (1) and Expression (2) are satisfied.

$$d4 \geq d3 \geq d2 \geq d1 \qquad (1)$$

$$d4 > d1 \qquad (2)$$

Figure 5A:
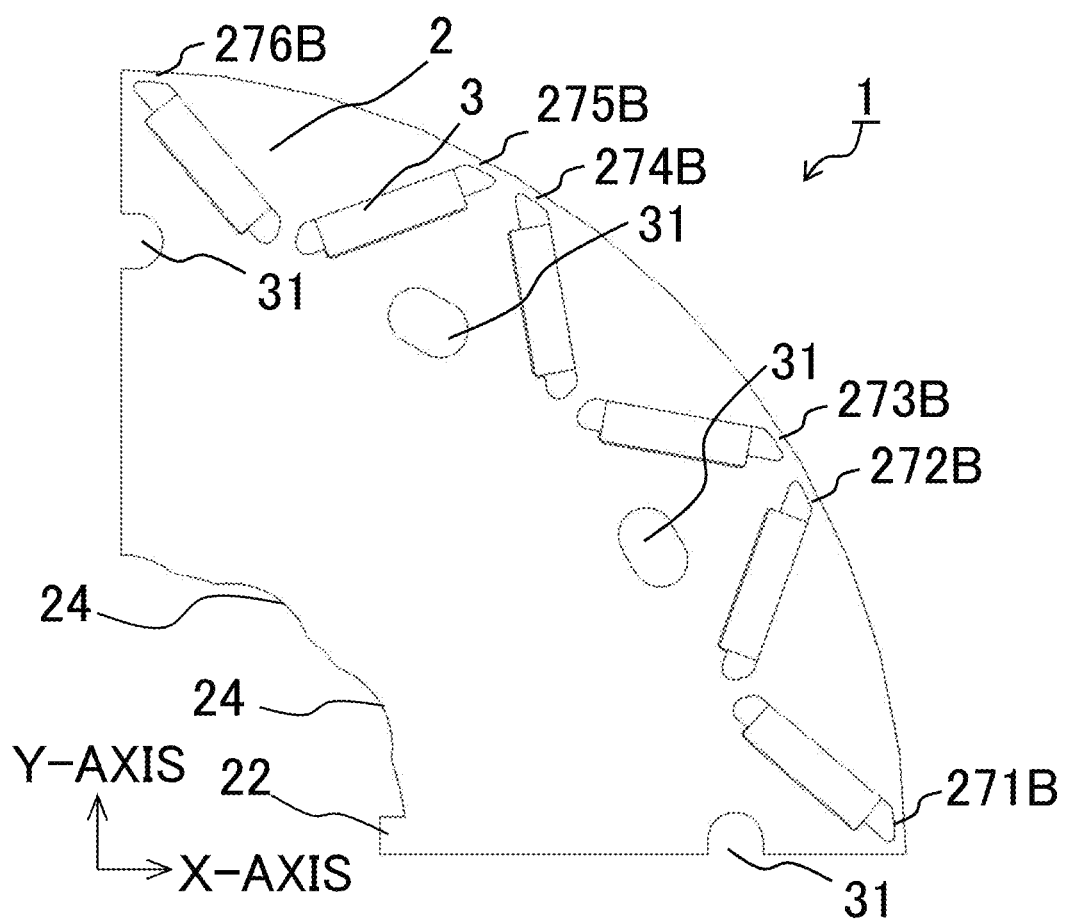
FIG. 5A is a plan view showing a one-quarter region of a rotor according to a first comparative example.
Figure 5B:
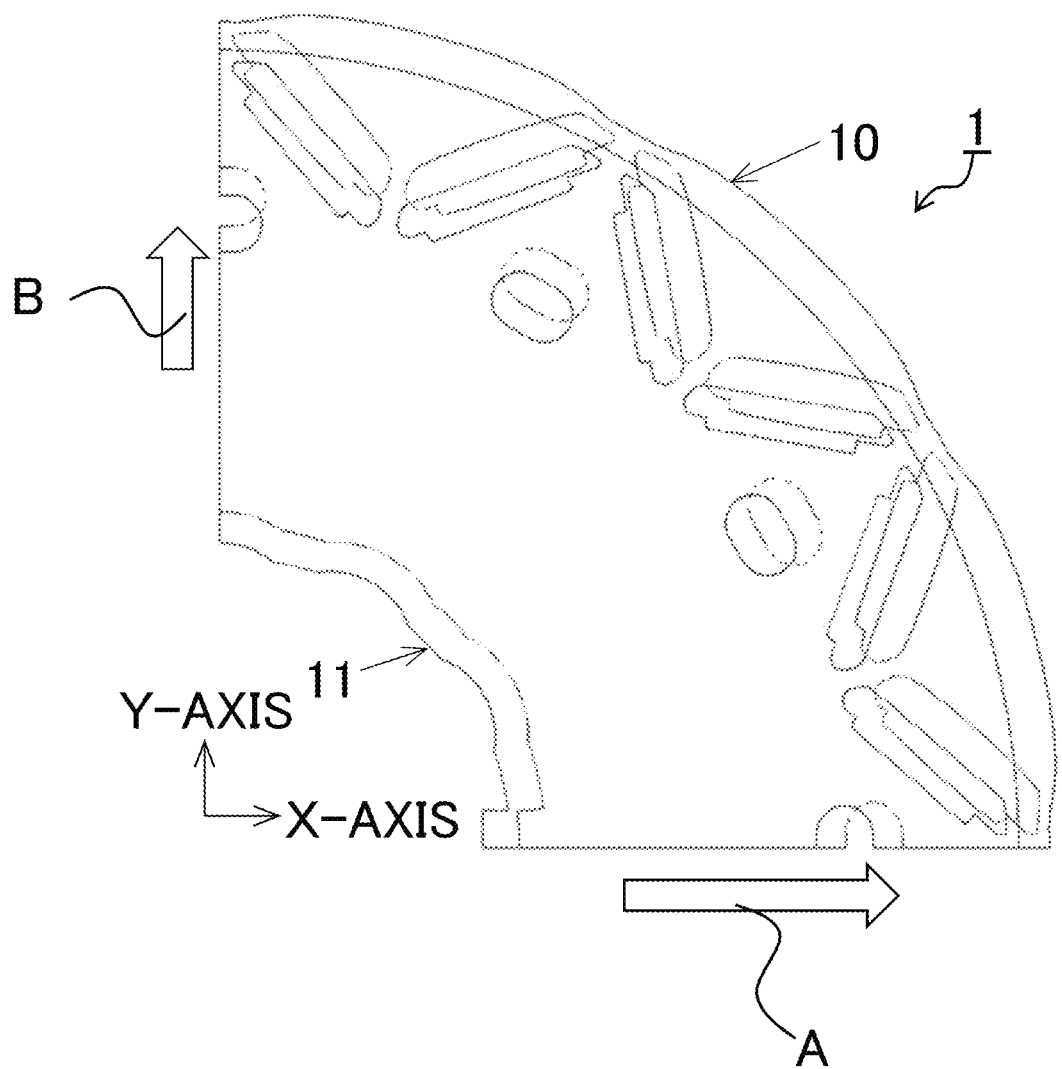
FIG. 5B is a plan view showing a distorted state of the rotor shown in FIG. 5A when rotating.
Figure 6:
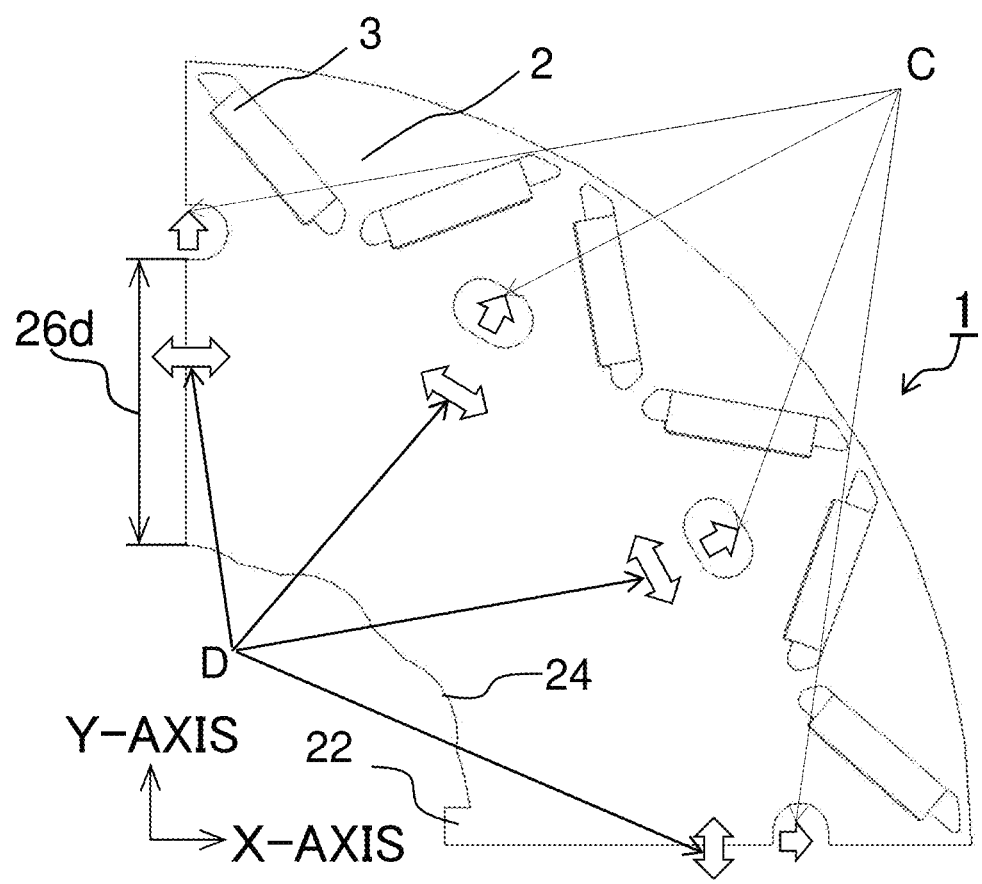
FIG. 6 is a drawing for describing a balancing groove advantage using the plan view shown in FIG. 5A.

FIG. 5A is a plan view showing a one-quarter region of a rotor according to a first comparative example, and FIG. 5B is a plan view showing a distorted state of the rotor shown in FIG. 5A when rotating. Also, FIG. 6 is a drawing for describing a balancing groove advantage using the plan view shown in FIG. 5A. Hereafter, actions and advantages of the first embodiment will be verified by verifying the first comparative example with reference to FIG. 5A, FIG. 5B, and FIG. 6.

In FIG. 5A, the rotor 1 acting as the first comparative example includes the permanent magnet 3 embedded in the rotor core 2, the key portion 22, a balancing groove 24, and the balancing hole 31, but does not include the stress relaxing groove 23. The balancing groove 24 is provided at each of angles the same as angles configuring magnetic poles, with the key portion 22 as a starting point, and is of the same configuration as that in Patent Document 1.

Also, FIG. 5B shows a distorted state of the rotor shown in FIG. 5A when rotating, and more specifically, shows a state wherein an initial outline 11 of the rotor core 2 and a distorted outline 10 of the rotor core 2 when the rotor 1 is caused to rotate at 13,000 rpm are enlarged by 200 times. A direction in which the key portion 22 is attached is an x-axis, and a direction perpendicular to the x-axis is a y-axis. Herein, FIG. 5A and FIG. 5B are symmetrical across the x-axis and the y-axis.

As a result of causing the rotor 1 to rotate under the aforementioned condition, a distortion amount A in the x-axis direction has increased with respect to a distortion amount B in the y-axis direction, as shown in FIG. 5B. That is, the rotor core 2 has become an elliptical distortion protruding in the x-axis direction. In FIG. 5B, the distortion amount A is such that centrifugal force acting on the key portion 22 and a decrease in circumferential direction rigidity caused by the balancing groove 24 are added to centrifugal force acting on the rotor 1 (distortion amount A: centrifugal force acting on rotor 1+centrifugal force acting on key portion 22+circumferential direction rigidity decrease caused by balancing groove 24). Also, the distortion amount B is such that centrifugal force acting on the balancing groove 24 is subtracted from centrifugal force acting on the rotor 1 (distortion amount B: centrifugal force acting on rotor 1−centrifugal force acting on balancing groove 24).

Herein, advantages of the balancing groove 24 will be described using FIG. 6, which shows the rotor 1 of the first comparative example. In FIG. 6, an arrow C indicates a distortion imbalance caused by a loss of centrifugal force occurring in the balancing groove 24, and an arrow D indicates a distortion imbalance caused by a decrease in circumferential direction rigidity. Two advantages of the balancing groove 24 will be cited.

The first advantage is that owing to the balancing groove 24 being provided, centrifugal force acting on the rotor core 2 decreases, and radial direction distortion is restricted. This distortion restricting advantage occurs locally at an angle in the rotor core 2 at which the balancing groove 24 is provided, because of which the rotor 1 of FIG. 6 is such that an amount of radial direction distortion at the angle at which the balancing groove 24 is provided is greater than an amount of radial direction distortion in a key portion direction (the x-axis direction), in which the balancing groove 24 is not provided.

The second advantage is that owing to a sectional area 26d of an inner peripheral portion of the rotor core 2 decreasing because of the balancing groove 24, rigidity of the inner peripheral portion decreases, and an amount of circumferential direction distortion increases. This distortion increasing advantage occurs locally at the angle in the rotor core 2 at which the balancing groove 24 is provided. Also, when the amount of circumferential direction distortion in a certain position increases, the amount of radial direction distortion in a direction perpendicular to the position of increase increases. That is, the rotor 1 of FIG. 6 is such that the amount of radial direction distortion in the key portion 22 direction (the x-axis direction), in which the balancing groove 24 is not provided, is greater than the amount of radial direction distortion at the angle at which the balancing groove 24 is provided.

In the first comparative example, the radial direction distortion in the x-axis direction increases owing to the key portion 22 being provided, and circumferential direction rigidity decreases, and circumferential direction distortion increases, owing to the balancing groove 24 being provided. In accompaniment to this, the amount of distortion in the perpendicular radial direction also increases, but the radial direction distortion is offset by the radial direction distortion restricting advantage obtained from a decrease in centrifugal force. Because of this, a remaining circumferential direction distortion is added to the x-axis direction distortion amount A.

Figure 7A:
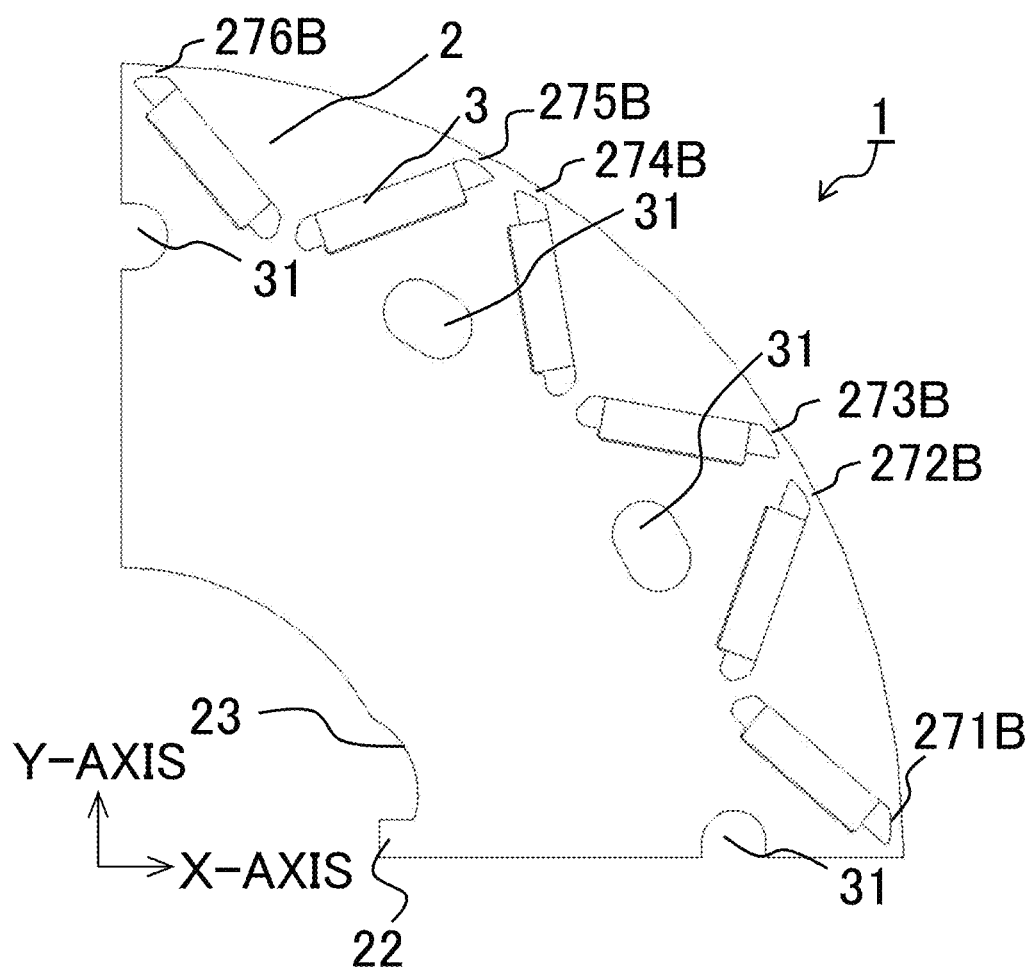
FIG. 7A is a plan view showing a one-quarter region of a rotor according to a second comparative example.
Figure 7B:
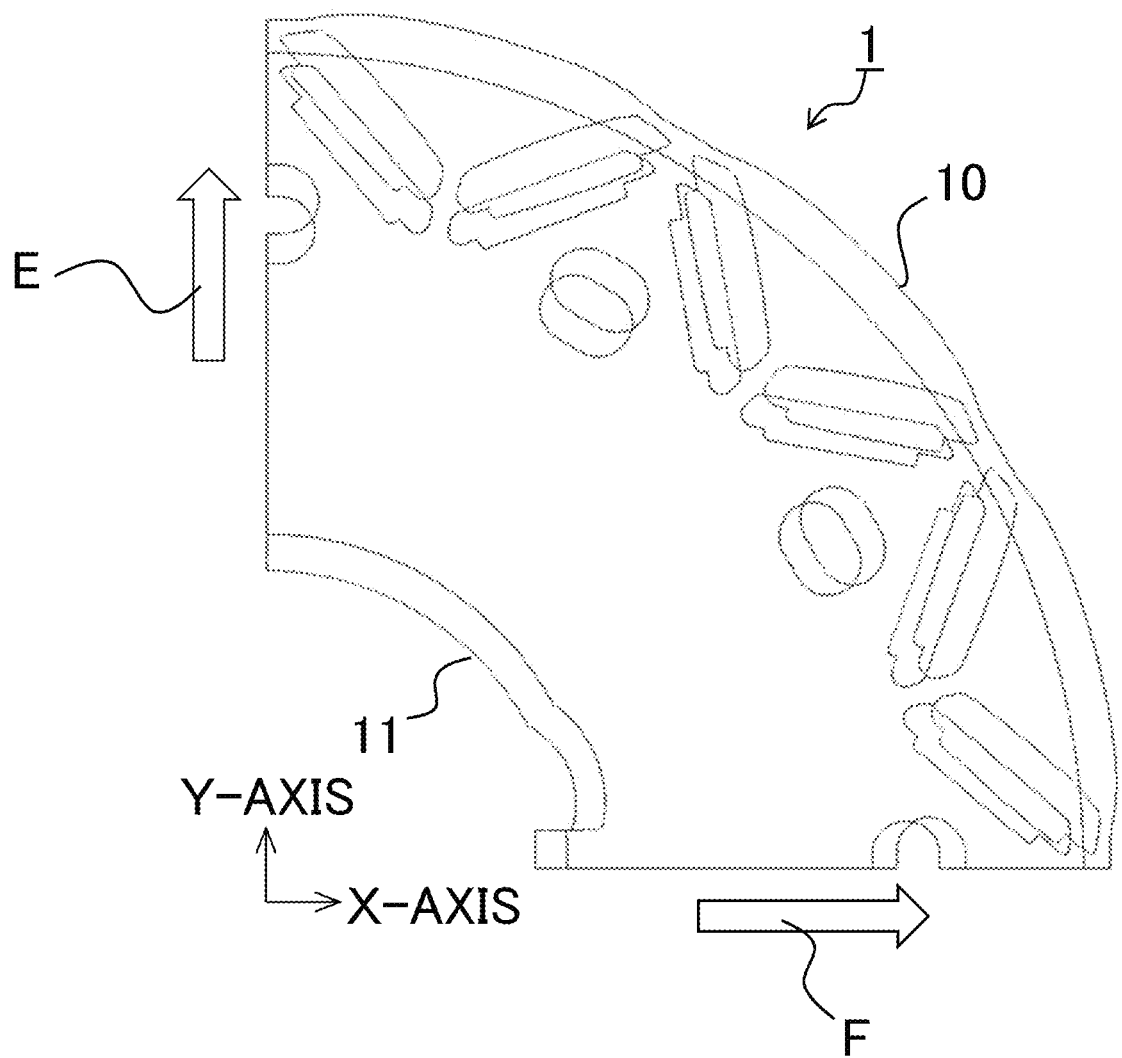
FIG. 7B is a plan view showing a distorted state of the rotor shown in FIG. 7A when rotating.

FIG. 7A is a plan view showing a one-quarter region of a rotor according to a second comparative example, and FIG. 7B is a plan view showing a distorted state of the rotor shown in FIG. 7A when rotating. In FIG. 7A, the rotor 1 acting as the second comparative example includes the permanent magnet 3 embedded in the rotor core 2, the key portion 22, the stress relaxing groove 23, and the balancing hole 31, but does not include the balancing groove 24.

Also, FIG. 7B shows a distorted state of the rotor shown in FIG. 7A when rotating, and more specifically, shows a state wherein the initial outline 11 of the rotor core 2 and the distorted outline 10 of the rotor core 2 when the rotor 1 is caused to rotate at 13,000 rpm are enlarged by 200 times. The direction in which the key portion 22 is attached is the x-axis, and the direction perpendicular to the x-axis is the y-axis. Herein, FIG. 7A and FIG. 7B are symmetrical across the x-axis and the y-axis.

It can be seen that as a result of causing the rotor 1 to rotate under the aforementioned condition, a distortion amount E in the y-axis direction has increased with respect to a distortion amount F in the x-axis direction, as shown in FIG. 7B. That is, the rotor core 2 has become an elliptical distortion protruding in the y-axis direction. In FIG. 7B, the distortion amount E is such that a decrease in circumferential direction rigidity caused by the stress relaxing groove 23 is added to centrifugal force acting on the rotor 1 (distortion amount E: centrifugal force acting on rotor 1+circumferential direction rigidity decrease caused by stress relaxing groove 23). Also, the distortion amount F is such that centrifugal force acting on the key portion 22 is added to centrifugal force acting on the rotor 1, and centrifugal force acting on the stress relaxing groove 23 is subtracted (distortion amount F: centrifugal force acting on rotor 1+centrifugal force acting on key portion 22−centrifugal force acting on stress relaxing groove 23).

In the second comparative example, two problems occur due to stress imbalance and distortion imbalance.

The first problem is a decrease in durability due to stress imbalance. When the rotor 1 rotates at high speed, outer peripheral bridge portions 271B to 276B of the respective magnetic poles, and the balancing hole 31, become stress concentration portions due to distortion of the rotor core 2, and high stress occurs. When the distorted form of each magnetic pole is uniform, the stress acting on the stress concentration portion is also uniform, but in the rotor core 2 of the first comparative example and the second comparative example, stress acting on the stress concentration portion is uneven due to stress imbalance, and the durability of the rotor core 2 decreases.

The second problem is a decrease in a destructive rotational speed due to distortion imbalance. It is desirable that an allowable rotational speed of the rotor 1 of the rotating electrical machine 100 is determined with consideration to a static strength and an endurance limit, and control is carried out in such a way that the rotor 1 is not caused to rotate at a maximum rotational speed or greater. However, the rotating electrical machine 100 used in an electric vehicle, a hybrid vehicle, or the like, is such that there is a case wherein the rotor 1 is forced to rotate at a rotational speed exceeding the allowable rotational speed due to a transmission of rotation from a drive system. When the allowable rotational speed is exceeded, the rotor core 2 is plastically distorted to an outer diameter side, and when the amount of radial direction distortion exceeds the width of a gap between the rotor core 2 and the stator core 5, contact occurs, and the rotating electrical machine 100 is damaged. The rotor core 2 of the first comparative example and the second comparative example is such that the protruding side of the elliptical distortion comes into contact with the stator core 5 with priority due to distortion imbalance, and the destructive rotational speed decreases.

Herein, advantages of the stress relaxing groove 23 will be described. The stress relaxing groove 23 has the two advantages of centrifugal force reduction and circumferential direction rigidity reduction, in the same way as the advantages of the balancing groove 24 described using FIG. 6, and imbalance is caused to occur in such a way that y-axis direction distortion becomes greater than x-axis direction distortion.

In the second comparative example, an increase in y-direction distortion due to the stress relaxing groove 23 exceeding an increase in x-direction distortion due to the key portion 22 is the cause of the elliptical distortion protruding in the y-axis direction being formed.

In the second comparative example, imbalance can be eliminated provided that balance between x-direction distortion due to the key portion 22 and y-direction distortion due to the stress relaxing groove 23 is secured, but as the stress relaxing groove 23 needs to be configured of a large-diameter arc or the like in order to reduce stress acting on the key portion 22, securing balance with the key portion 22 is difficult. Also, although the key portion 22 causes imbalance to occur owing to an increase in centrifugal force, the stress relaxing groove 23 causes imbalance to occur owing to the two advantages of centrifugal force reduction and circumferential direction rigidity reduction, because of which a size of the stress relaxing groove 23 needs to be in the region of one-half of a size of the key portion 22 in order to secure balance, and design becomes still more difficult.

Figure 8A:
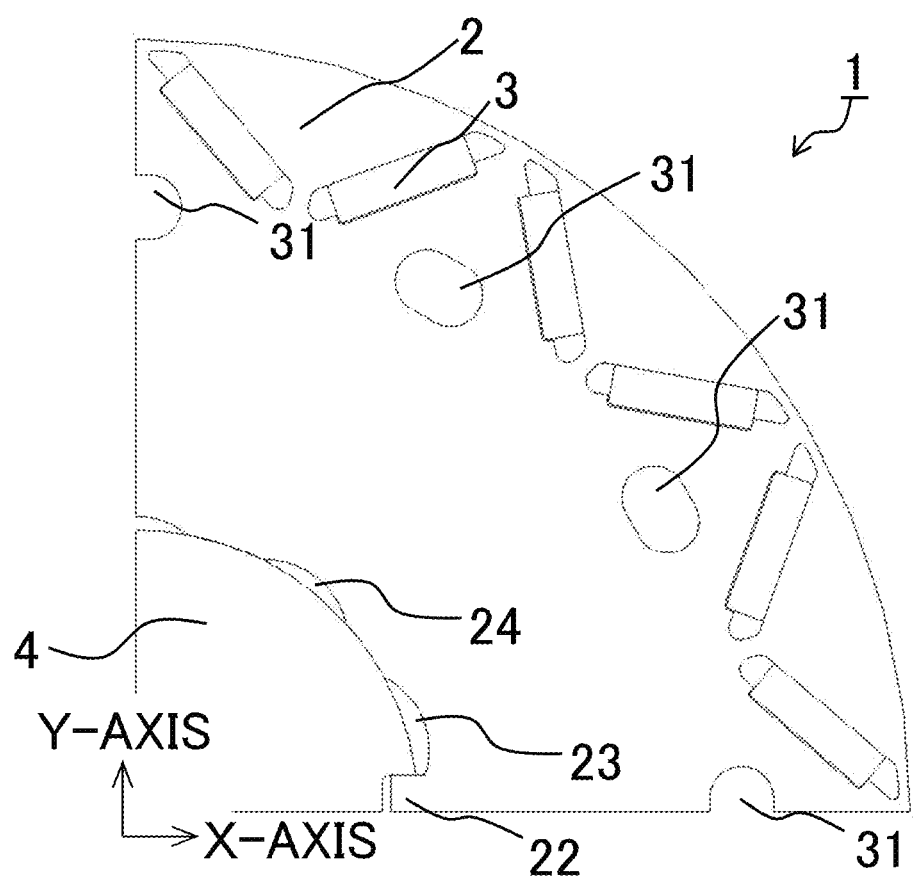
FIG. 8A is a plan view showing a one-quarter region of a rotor according to a third comparative example.
Figure 8B:
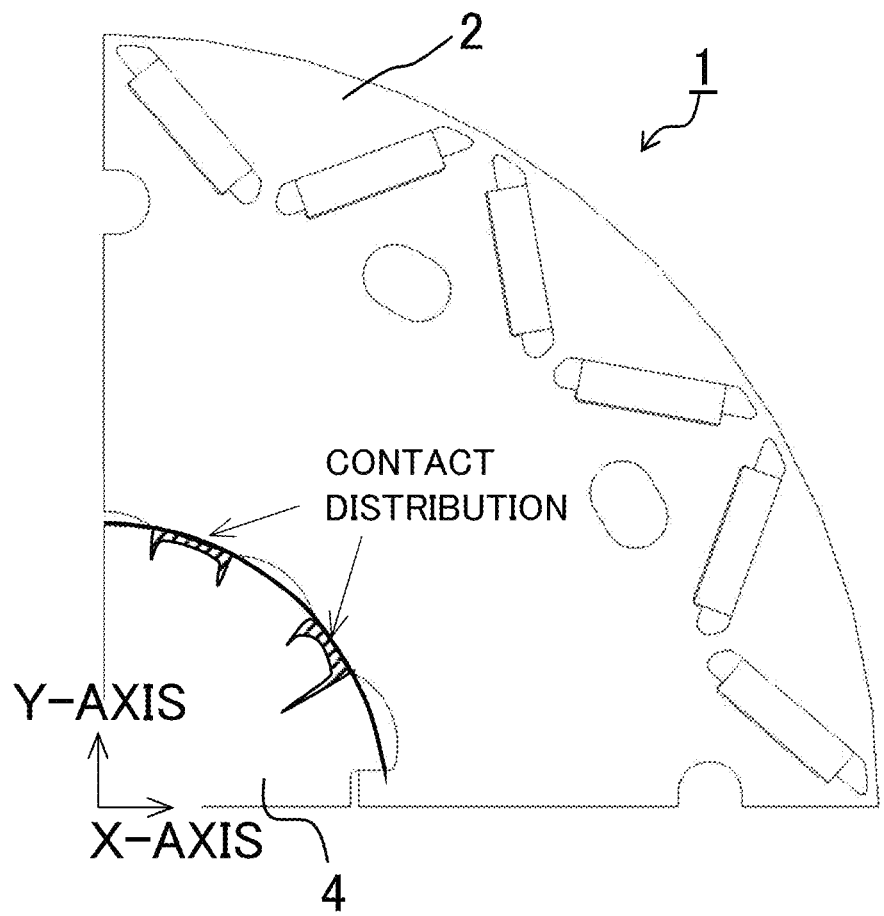
FIG. 8B is a plan view showing a distribution of contact with a shaft when the rotor shown in FIG. 8A is rotating.

FIG. 8A is a plan view showing a one-quarter region of a rotor according to a third comparative example, and FIG. 8B is a plan view showing a distribution of contact with a shaft when the rotor shown in FIG. 8A is rotating.

In FIG. 8A, the rotor 1 acting as the third comparative example includes the permanent magnet 3 embedded in the rotor core 2, the key portion 22, the stress relaxing groove 23, the balancing hole 31, the balancing groove 24, and the shaft 4. The rotor core 2 is fitted to the shaft 4 by press fitting. Also, FIG. 8B shows a contact distribution in a press-fitted portion between the rotor core 2 and the shaft 4 when the rotor 1 shown in FIG. 8A is caused to rotate at 13,000 rpm.

Figure 9A:
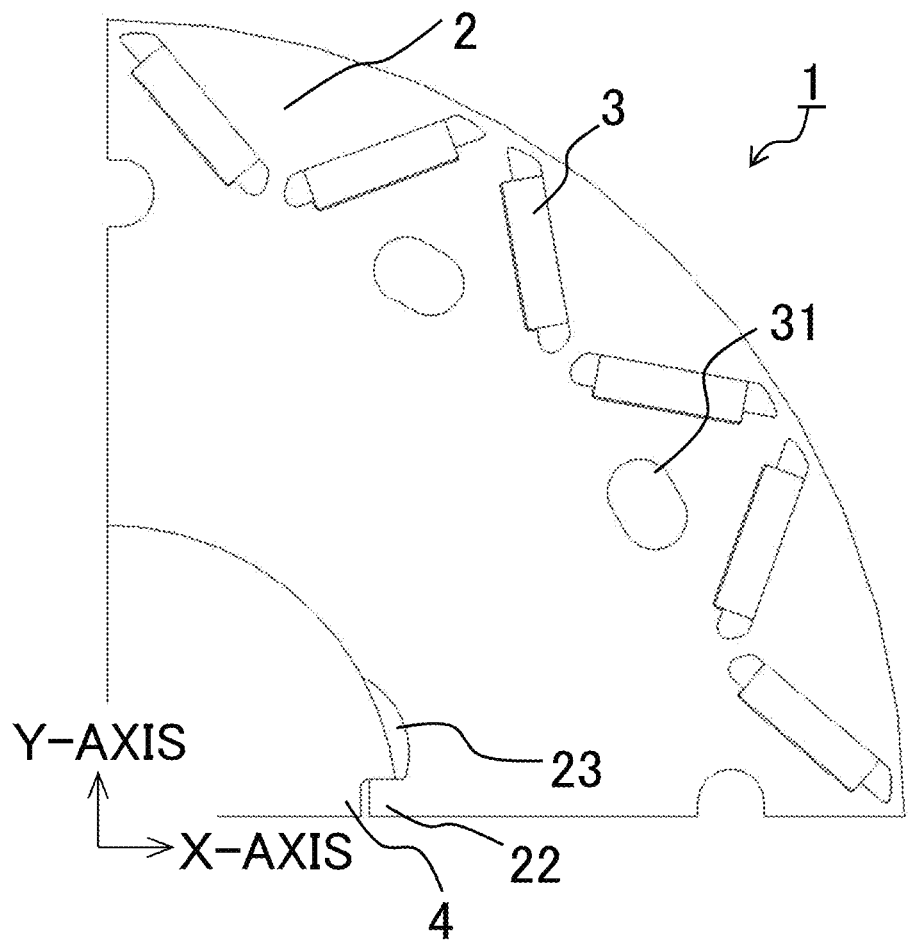
FIG. 9A is a plan view showing a one-quarter region of a rotor according to a fourth comparative example.

Also, FIG. 9A is a plan view showing a one-quarter region of a rotor according to a fourth comparative example, and FIG. 9B is a plan view showing a distribution of contact with a shaft when the rotor shown in FIG. 9A is rotating.

In FIG. 9A, the rotor 1 acting as the fourth comparative example includes the permanent magnet 3 embedded in the rotor core 2, the key portion 22, the stress relaxing groove 23, the balancing hole 31, and the shaft 4, but does not include the balancing groove 24. Also, the rotor core 2 is fitted to the shaft 4 by press fitting.

Also, FIG. 9B shows a contact distribution in a press-fitted portion between the rotor core 2 and the shaft 4 when the rotor 1 shown in FIG. 9A is caused to rotate at 13,000 rpm. It can be seen that compared with the third comparative example, the contact distribution in the press-fitted portion between the rotor core 2 and the shaft 4 is over a wider region in the fourth comparative example. That is, it can be seen that an area of contact between the rotor core 2 and the shaft 4 is greater, and transmitted torque is greater, in the fourth comparative example than in the third comparative example.

Herein, torque transmission will be described. Two means of transmitting torque between the rotor core 2 and the shaft 4 of the rotor 1 according to the rotating electrical machine 100 can be cited.

The first means is a key structure wherein positioning is carried out by causing the key portion 22 protruding to the inner peripheral side from the inner peripheral face of the rotor core 2 to fit together with the key groove portion 41 provided in the outer peripheral face of the shaft 4. This key structure enables torque to be transmitted between the rotor core 2 and the shaft 4 even at a time of high speed rotation, but there is a problem in that as there is rattling commensurate with an increase in an inner diameter of the rotor core 2 caused by centrifugal force or with a dimensional tolerance of the key portion 22, accuracy of positioning the rotor core 2 and the shaft 4 decreases.

The second means is a structure wherein the inner peripheral face of the rotor core 2 and the outer peripheral face of the shaft 4 are press-fitted or in an interference fit, and torque is caused to be transmitted by frictional force of a contact portion. With this structure, there is a problem in that when the rotor core 2 separates from the shaft 4 due to centrifugal force at a time of high speed rotation, the inner diameter of the rotor core 2 increases, and a tightening margin is eliminated, torque can no longer be transmitted.

Because of this, a structure wherein the aforementioned two structures are used together, thereby eliminating the problem of each, is often used.

Figure 10A:
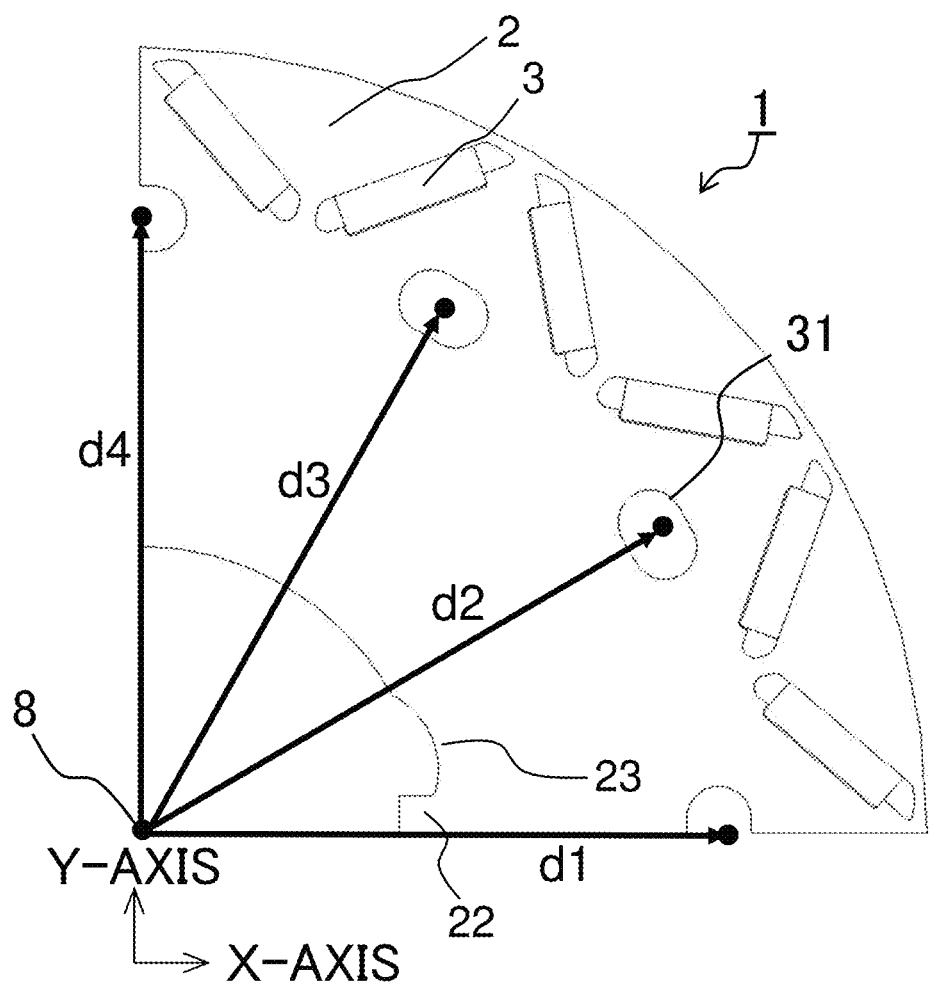
FIG. 10A is a plan view showing a one-quarter region of the rotor of the rotating electrical machine according to the first embodiment.

FIG. 10A is a plan view showing a one-quarter region of the rotor of the rotating electrical machine according to the first embodiment. Also, FIG. 10B is a plan view showing a distorted state of the rotor shown in FIG. 10A when rotating.

In FIG. 10A, the rotor 1 of the first embodiment includes the permanent magnet 3 embedded in the rotor core 2, the key portion 22, the stress relaxing groove 23, and the balancing hole 31. That is, the straight lines d1, d2, d3, and d4 as far as the centers of the respective balancing holes 31, with the center of the rotor core 2 as the starting point 8, are in the relationship of Expression (3). In the first embodiment, the size of the straight line d4 is adopted as a reference.

$$d4 > d3 > d2 > d1 \quad (3)$$

Figure 10B:
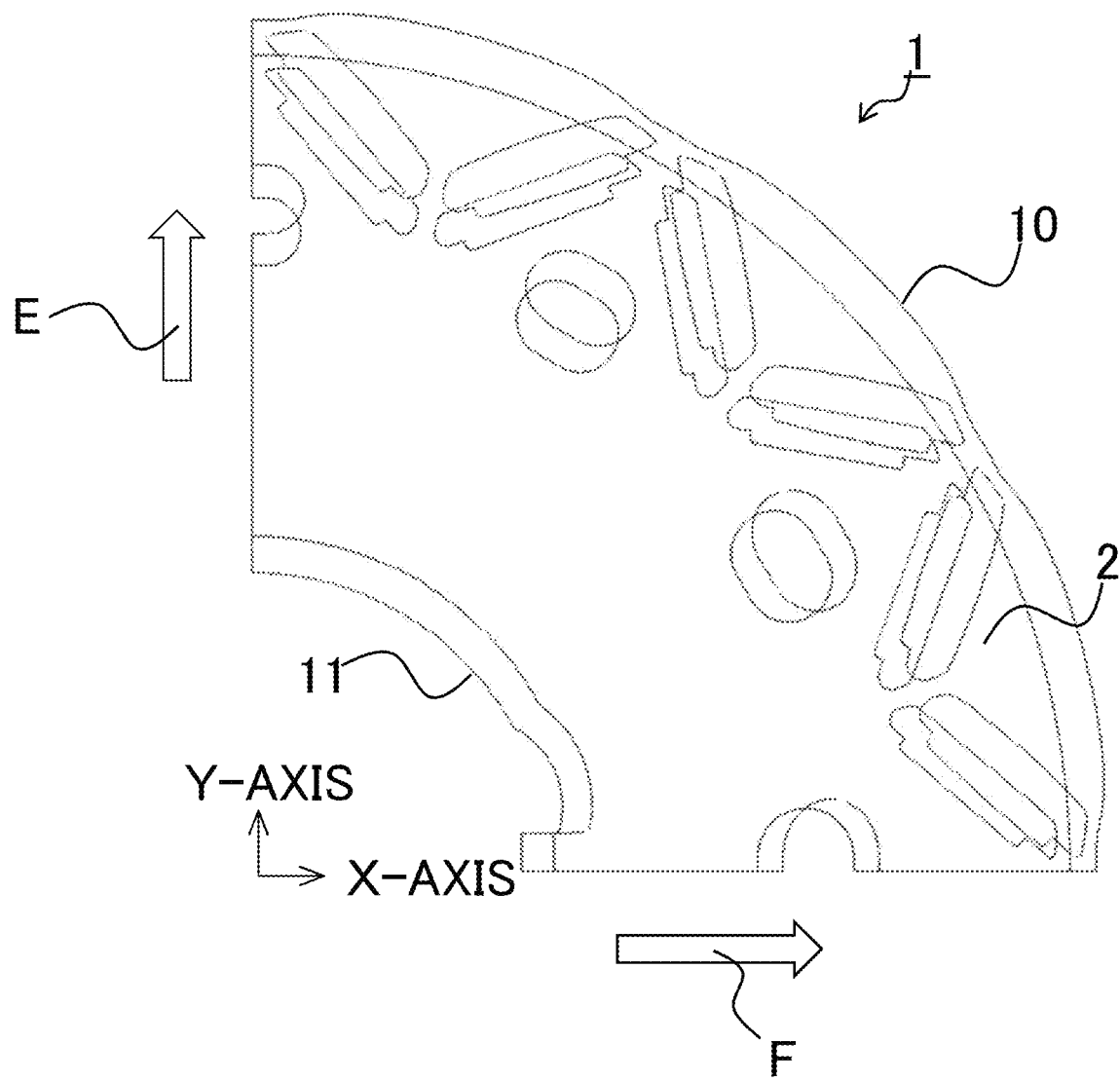
FIG. 10B is a plan view showing a distorted state of the rotor shown in FIG. 10A when rotating.

Also, FIG. 10B shows a distorted state of the rotor 1 shown in FIG. 10A when rotating, and more specifically, shows a state wherein the initial outline 11 of the rotor core 2 and the distorted outline 10 of the rotor core 2 when the rotor 1 is caused to rotate at 13,000 rpm are enlarged by 200 times. The direction in which the key portion 22 is attached is the x-axis, and the direction perpendicular to the x-axis is the y-axis. FIG. 10A and FIG. 10B are symmetrical across the x-axis and the y-axis.

In FIG. 10B, it can be seen that the distortion amount E in the y-axis direction is large with respect to the distortion amount F in the x-axis direction. That is, the rotor core 2 has become an elliptical distortion protruding in the y-axis direction. The y-axis direction distortion is greater than in the first comparative example, but smaller than in the second comparative example. That is, according to the rotor 1 of the rotating electrical machine 100 of the first embodiment, distortion imbalance when rotating can be restricted more than in the second comparative example. The distortion amount E is such that a decrease in circumferential direction rigidity caused by the stress relaxing groove 23 is added to centrifugal force acting on the rotor 1 (distortion amount E: centrifugal force acting on rotor 1+circumferential direction rigidity decrease caused by stress relaxing groove 23). Also, the distortion amount F is such that centrifugal force acting on the key portion 22 is added to centrifugal force acting on the rotor 1, and centrifugal force acting on the stress relaxing groove 23 is subtracted (distortion amount F: centrifugal force acting on rotor 1+centrifugal force acting on key portion 22−centrifugal force acting on stress relaxing groove 23).

FIG. 11A is a drawing wherein stress in the rotor of the rotating electrical machine according to the first embodiment and in the rotors of the first comparative example and the second comparative example is compared. Also, FIG. 11B is a drawing wherein radial direction contact force in the rotor of the rotating electrical machine according to the first embodiment and in the rotors of the third comparative example and the fourth comparative example is compared.

Herein, stress in the first embodiment and in the first comparative example and the second comparative example, and radial direction contact force in the first embodiment and in the third and fourth comparative examples, will be compared. Stress and radial direction contact force are evaluated in the rotor core 2 when the rotor 1 is caused to rotate at 13,000 rpm. A maximum stress acting on each of the outer peripheral bridge portions 271B to 276B, and a standard deviation thereof, are shown in FIG. 11A. Also, radial direction contact force between the rotor core 2 and the shaft 4 is shown in FIG. 11B.

In FIG. 11A, the maximum stress in the outer peripheral bridge portions 271B to 276B in the first embodiment is less than that in the second comparative example. Also, as the standard deviation of the maximum stress acting on the outer peripheral bridge portions 271B to 276B is also less than in the second comparative example, it is understood that stress unevenness is restricted in the first embodiment, and the rotor core 2 is a rotor core with greater durability. In the first comparative example, it is understood that stress unevenness is restricted in the same way as in the first embodiment owing to the advantage of the balancing groove 24 described using FIG. 6, and the rotor core 2 is a rotor core with high durability. When focusing on radial direction contact force, however, that of the first embodiment exceeds the radial direction contact force of the third comparative example and the fourth comparative example, as shown in FIG. 11B. That is, torque transmitted between the rotor core 2 and the shaft 4 can be maintained higher in the first embodiment than in the third comparative example and the fourth comparative example.

Because of the heretofore described two points, the first embodiment can provide a structure wherein evenness of stress in the outer peripheral bridge portions 271B to 276B is of the same extent as in the first comparative example, but holding torque can be maintained higher, and separation between the rotor core 2 and the shaft 4 at a time of high speed rotation is prevented.

Herein, an advantage obtained by changing the installation position of the balancing hole 31 will be described using FIG. 10A, which shows the rotor 1 of the first embodiment. Two advantages are obtained by applying Expression (3) to the installation position of the balancing hole 31.

The first advantage is that by reducing a distance from the center of the rotor core 2 to the center of the balancing hole 31, centrifugal force acting on the rotor core 2 decreases, and radial direction distortion is restricted. As this distortion restricting advantage occurs locally in places to which the position of the balancing hole 31 has been changed, the rotor 1 shown in FIG. 10A is such that the amount of radial direction distortion in the direction in which the length to the center of the balancing hole 31 is reduced (the x-axis direction) is greater than the amount of radial direction distortion in the direction with a greater length (the y-axis direction).

The second advantage is that by configuring the straight line d1 on the first balancing hole central line 311L to be shorter than the straight line d4 on the fourth balancing hole central line 314L, inner peripheral portion rigidity decreases, and the amount of circumferential direction distortion increases. When the amount of circumferential direction distortion in a certain position increases, the amount of radial direction distortion in a direction perpendicular to the position of increase increases.

That is, the rotor 1 of FIG. 10A is such that the amount of radial direction distortion in the direction in which the length of the straight line d1 to the center of the balancing hole 31 is reduced (the x-axis direction) is greater than the amount of radial direction distortion in the straight line d4 direction (the y-axis direction).

According to the aforementioned advantages, it is understood that the rotor core 2 of the first embodiment is such that distortion in the x-axis direction is promoted more than in the second comparative example, and the previously occurring imbalance wherein the elliptical distortion protruding in the y-axis direction occurs can be restricted.

Figure 12A:
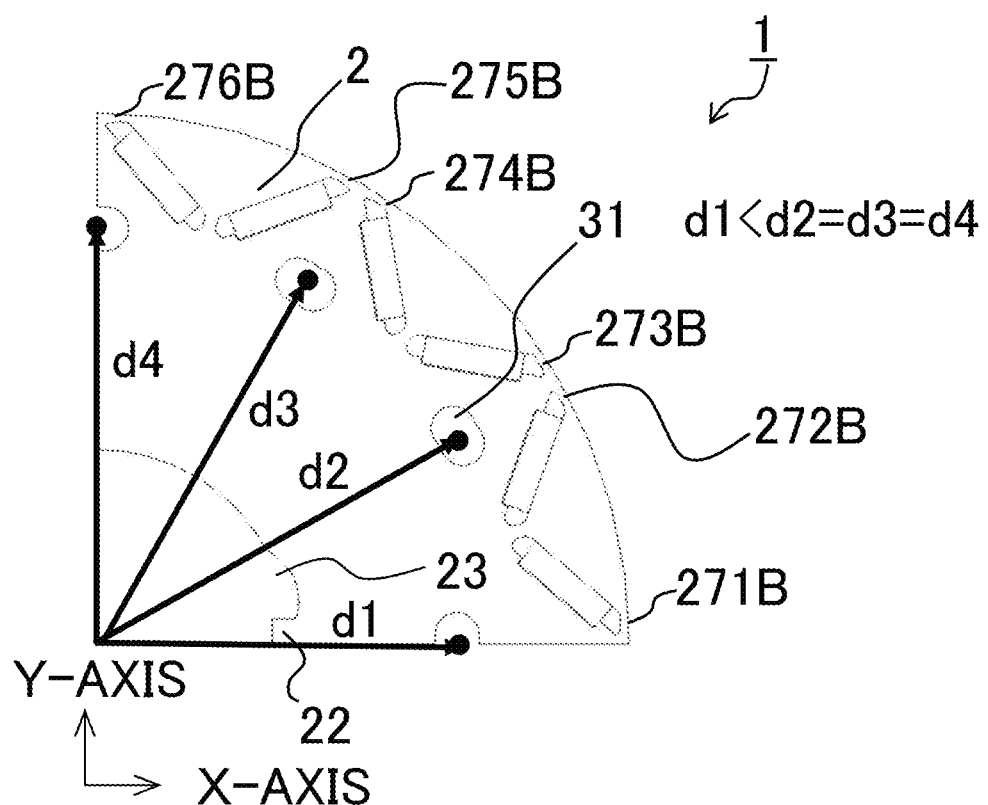
FIG. 12A is a plan view showing a first variation of the rotating electrical machine according to the first embodiment.
Figure 12B:
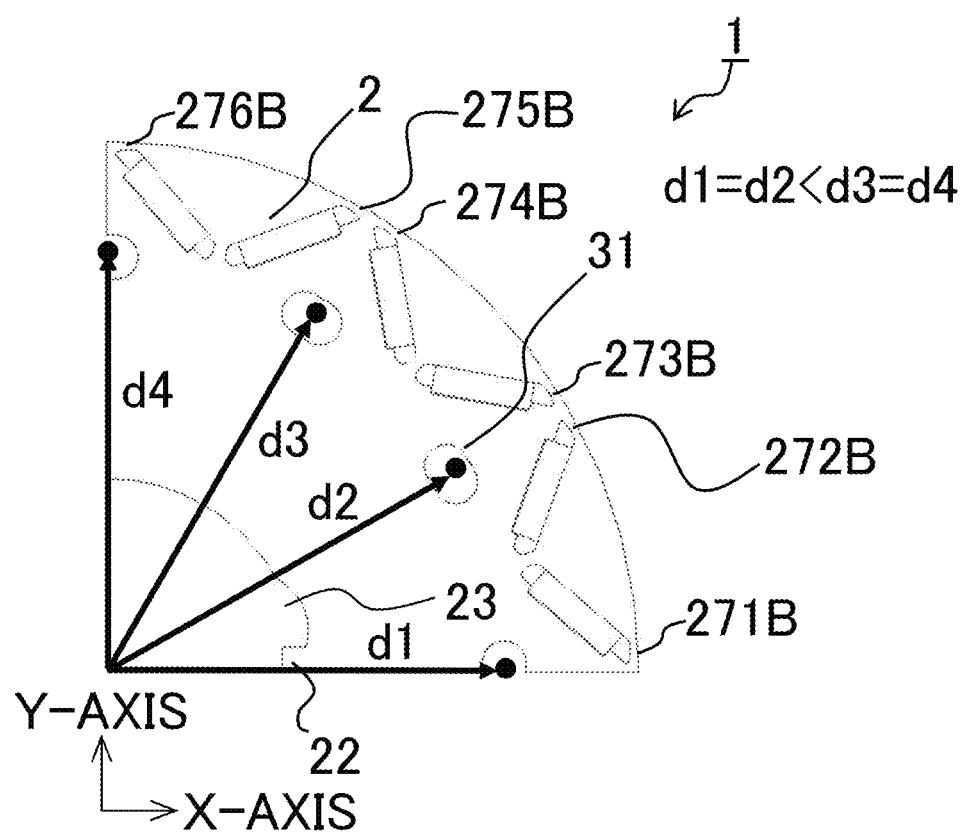
FIG. 12B is a plan view showing a second variation of the rotating electrical machine according to the first embodiment.

FIG. 12A is a plan view showing a first variation of the rotating electrical machine according to the first embodiment, and FIG. 12B is a plan view showing a second variation of the rotating electrical machine according to the first embodiment. Also, FIG. 12O is a plan view showing a third variation of the rotating electrical machine according to the first embodiment.

As shown in FIG. 12A, the first variation of the first embodiment shows a configuration wherein only the straight line d1 as far as the center of the balancing hole 31 is short in comparison with d4. That is, the straight lines d1 to d4 as far as the centers of the balancing holes 31 of the rotor core 2 shown in FIG. 12A are in the relationship of Expression (4).

$$d4=d3=d2>d1 \quad (4)$$

Next, as shown in FIG. 12B, the second variation of the first embodiment shows a configuration wherein the straight lines d1 and d2 as far as the centers of the balancing holes 31 are equal, and short in comparison with d4. That is, the straight lines d1 to d4 as far as the centers of the balancing holes 31 of the rotor core 2 shown in FIG. 12B are in the relationship of Expression (5).

$$d4=d3>d2=d1 \quad (5)$$

Furthermore, as shown in FIG. 12O, the third variation of the first embodiment shows a configuration wherein the straight lines d1, d2, and d3 as far as the centers of the balancing holes 31 are equal, and short in comparison with d4. That is, the straight lines d1 to d4 as far as the centers of the balancing holes 31 of the rotor core 2 shown in FIG. 12O are in the relationship of Expression (6).

$$d4>d3=d2=d1 \quad (6)$$

Figure 12C:
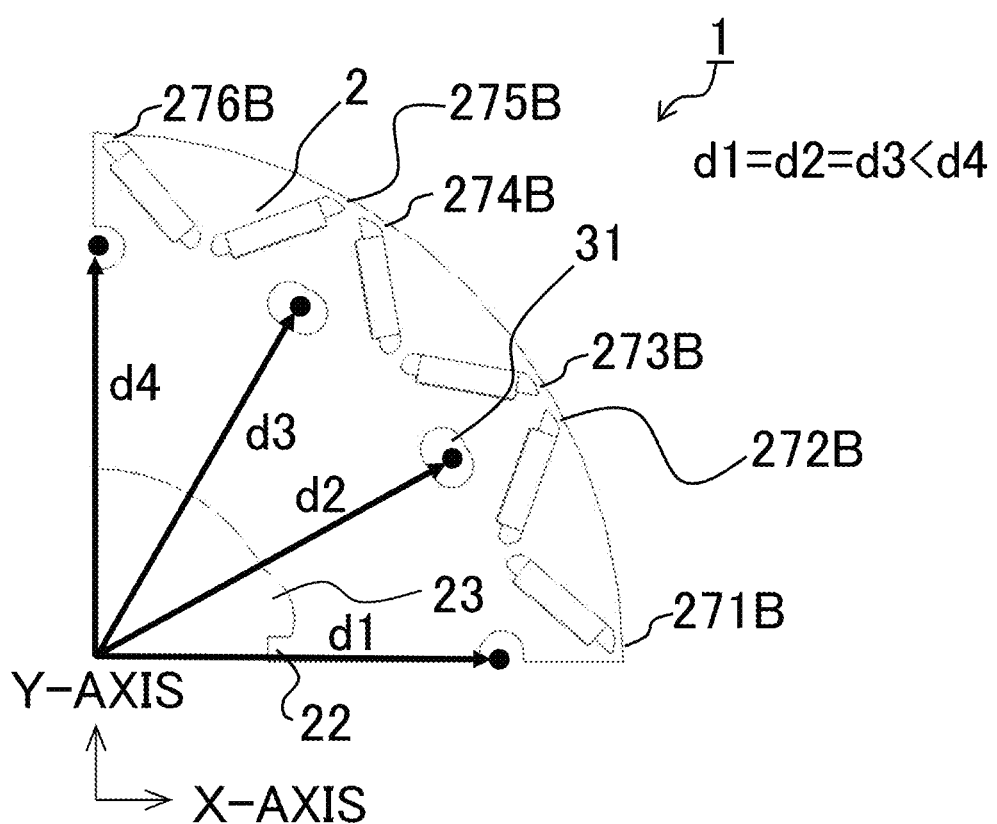
FIG. 12C is a plan view showing a third variation of the rotating electrical machine according to the first embodiment.

Herein, stress in the first variation, the second variation, and the third variation of the first embodiment, and in the second comparative example, will be compared. Stress is evaluated in the rotor core 2 when the rotor 1 shown in FIG. 12A to FIG. 12C is caused to rotate at 13,000 rpm.

FIG. 13 is a drawing that compares a maximum stress acting on each of the outer peripheral bridge portions 271B to 276B in the rotor of the first variation, the second variation, and the third variation of the rotating electrical machine according to the first embodiment, and in the rotor of the second comparative example. As shown in FIG. 13, it can be seen that maximum stress in all of the first variation, the second variation, and the third variation of the first embodiment drops below the maximum stress in the second comparative example.

That is, it can be seen that imbalance is restricted by the positions of the balancing holes 31 other than the balancing hole 31 on the fourth balancing hole central line 314L being nearer than d4, and stress acting on the outer peripheral bridge portions 271B to 276B can be reduced. That is, it can be seen that a structure of the rotor 1 that satisfies Expression (1) and Expression (2) rather than Expressions (3) to (6) is a structure that is advantageous in restricting stress imbalance.

$$d4 \geq d3 \geq d2 \geq d1 \quad (1)$$

$$d4 > d1 \quad (2)$$

As heretofore described, the rotating electrical machine 100 according to the first embodiment is characterized by including the stator 7 and the rotor 1, which has the rotor core 2 disposed on the inner side of the stator 7, the key portion 22 formed protruding in the radial direction from the inner peripheral face of the rotor core 2, the stress relaxing groove 23, which is provided at both ends of the key portion 22 and is formed recessed farther to the radial direction outer side than the inner peripheral face of the rotor core 2, and the multiple of balancing holes 31 provided one each between each pair of the multiple of magnetic poles of the rotor core 2, wherein lengths from the center of the rotor core 2 to the center of each of the multiple of balancing holes 31 are such that the length of the first straight line d1, which passes through the center of the key portion 22, is less than a length of an nth straight line do that intersects with the first straight line d1 vertically.

Also, the rotating electrical machine 100 according to the first embodiment is characterized in that when a first straight line as far as the center of the balancing hole 31 on the half-line that passes through the center of the key portion 22, with the center of the rotor core 2 as the starting point 8, is defined as d1, an nth straight line as far as the center of the balancing hole 31 on a half-line that intersects with the first straight line d1 vertically, with the center of the rotor core 2 as the starting point 8, is defined as dn, and straight lines as far as the centers of balancing holes 31 between each pair of the multiple of magnetic poles sandwiched in the circumferential direction between the two balancing holes (the balancing hole on the first straight line and the balancing hole on the nth straight line), with the center of the rotor core 2 as the starting point 8, are defined as d2, d3, ... and so on to dn−1 in order from the nearest to the balancing hole 31 on d1, which is the first straight line, d1 to dn satisfy Expression (7) and Expression (8) (note that natural number n>1).

$$dn \geq dn-1 \geq \ldots \geq d1 \quad (7)$$

$$dn > d1 \quad (8)$$

The rotating electrical machine 100 according to the first embodiment is such that when the key portion 22, and the stress relaxing groove 23 at both ends of the key portion 22, are provided on the inner periphery of the rotor core 2, the area of contact between the rotor core 2 and the shaft 4 is secured, and separation of the two is prevented, by not standardizing the positions of the balancing holes provided between the magnetic poles, and distortion imbalance and stress imbalance of the rotor core 2 caused by the key portion 22 and the stress relaxing groove 23 can be efficiently restricted, whereby the rotating electrical machine 100 with increased durability can be provided.

Second Embodiment

Figure 14:
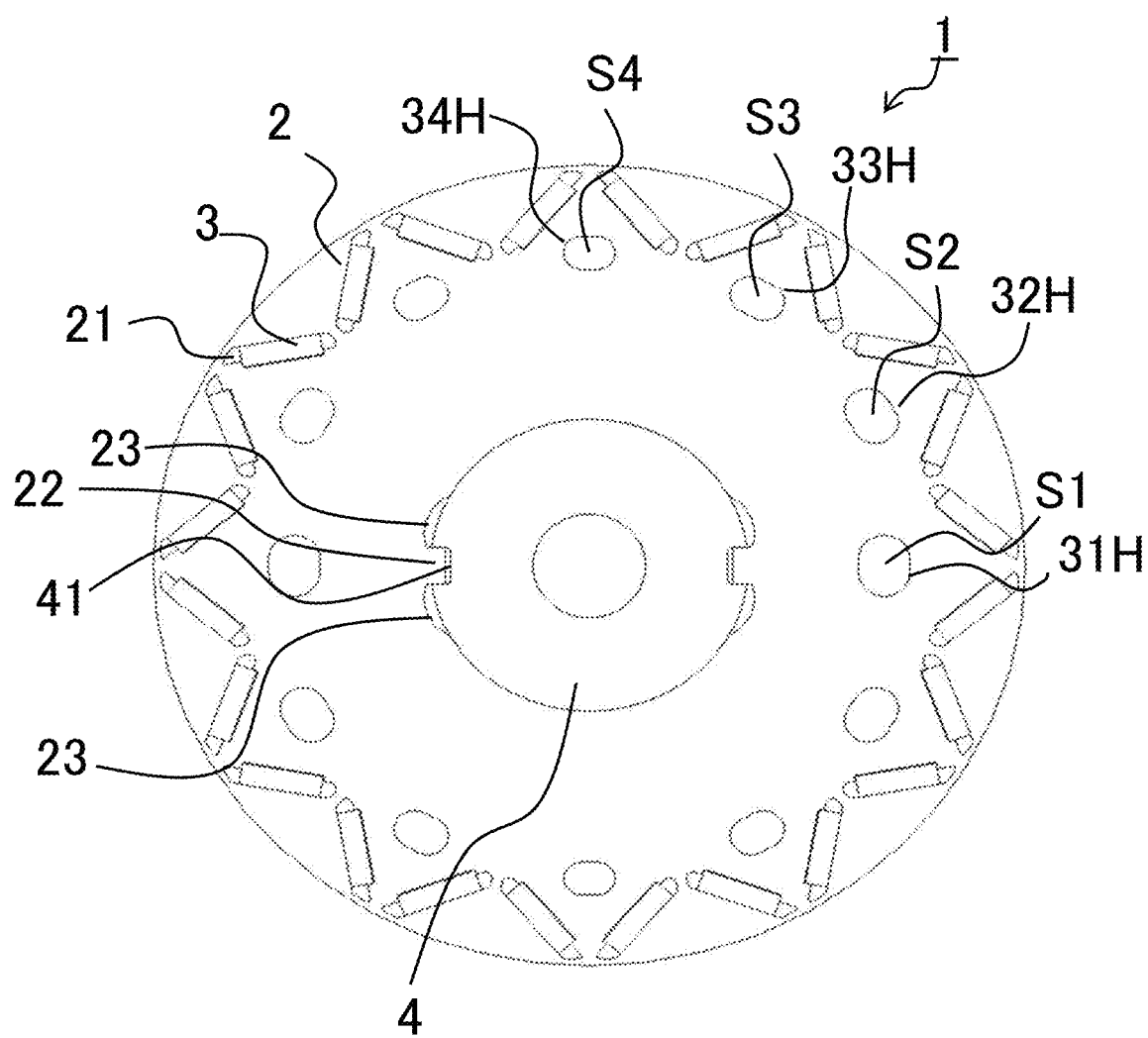
FIG. 14 is a plan view showing a rotor of a rotating electrical machine according to a second embodiment.

FIG. 14 is a plan view showing a rotor of a rotating electrical machine according to a second embodiment. In FIG. 14, a reference sign identical to a reference sign used to describe the rotating electrical machine 100 in the first embodiment being allotted indicates that a configuration is an identical or corresponding configuration, and a description thereof will be omitted. The rotor core 2 in the second embodiment is such that, in order to restrict distortion imbalance and stress imbalance at a time of high speed rotation, through holes of a non-uniform form (non-uniform balancing holes 31H, 32H, 33H, and 34H) for reducing weight and reducing stress acting on the magnet insertion hole 21 are provided between neighboring magnetic poles.

Figure 15:
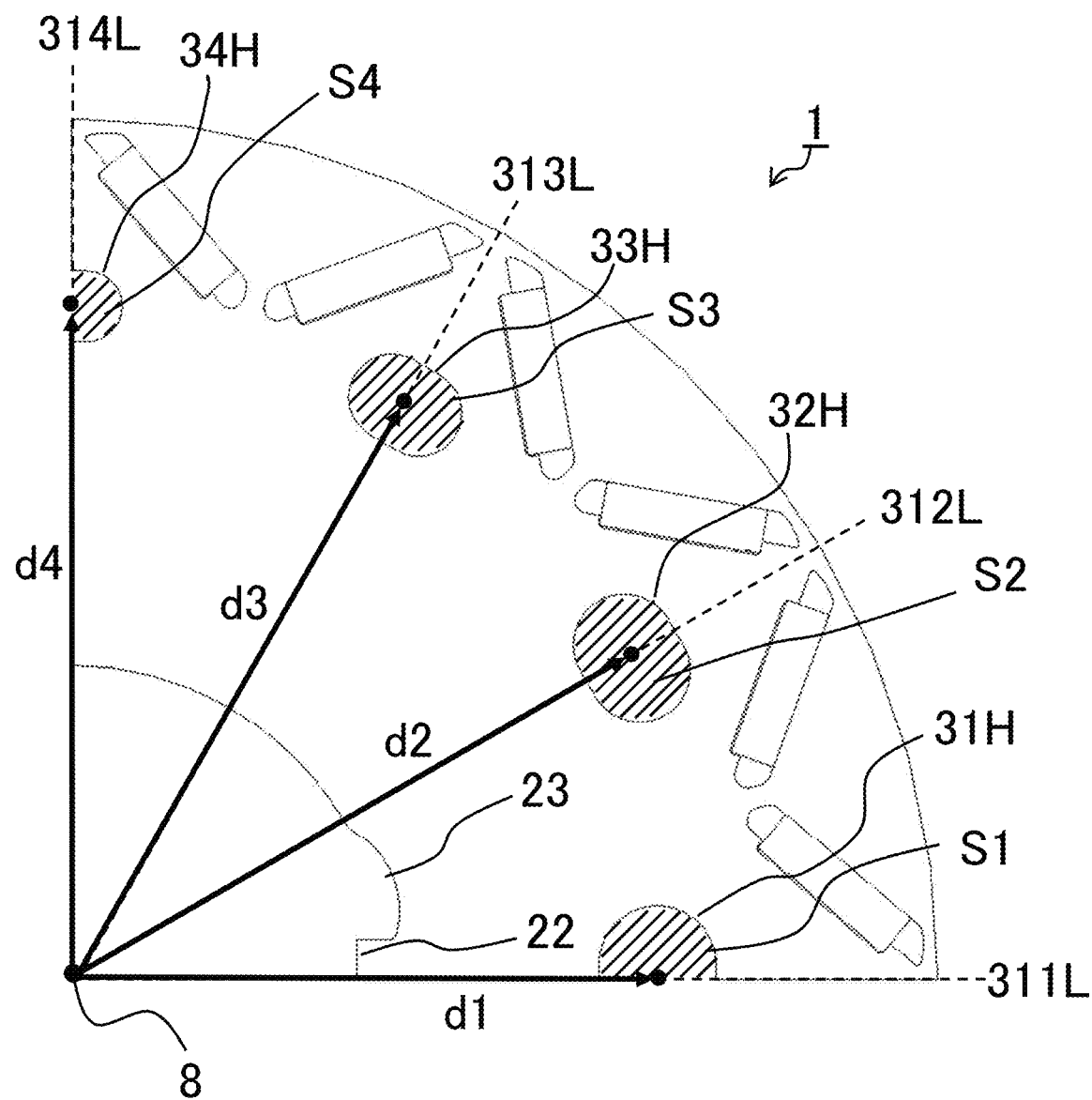
FIG. 15 is a plan view for describing installation positions of balancing holes in the rotor of the rotating electrical machine according to the second embodiment.

FIG. 15 is a plan view for describing installation positions of balancing holes in the rotor of the rotating electrical machine according to the second embodiment. FIG. 15 shows an enlarged display of only one-quarter of the rotor 1 of the rotating electrical machine 100 according to the second embodiment, and the shaft 4 is omitted.

The rotor 1 of the rotating electrical machine according to the second embodiment is such that, as shown in FIG. 15, areas of balancing holes on the first balancing hole central line 311L, the second balancing hole central line 312L, the third balancing hole central line 313L, and the fourth balancing hole central line 314L are defined in order as S1, S2, S3, and S4, and the balancing holes 31H, 32H, 33H, and 34H are disposed in such a way that Expression (1), Expression (2), and Expression (9) are satisfied.

$$S4 \leq S3 \leq S2 \leq S1 \qquad (9)$$

Figure 16A:
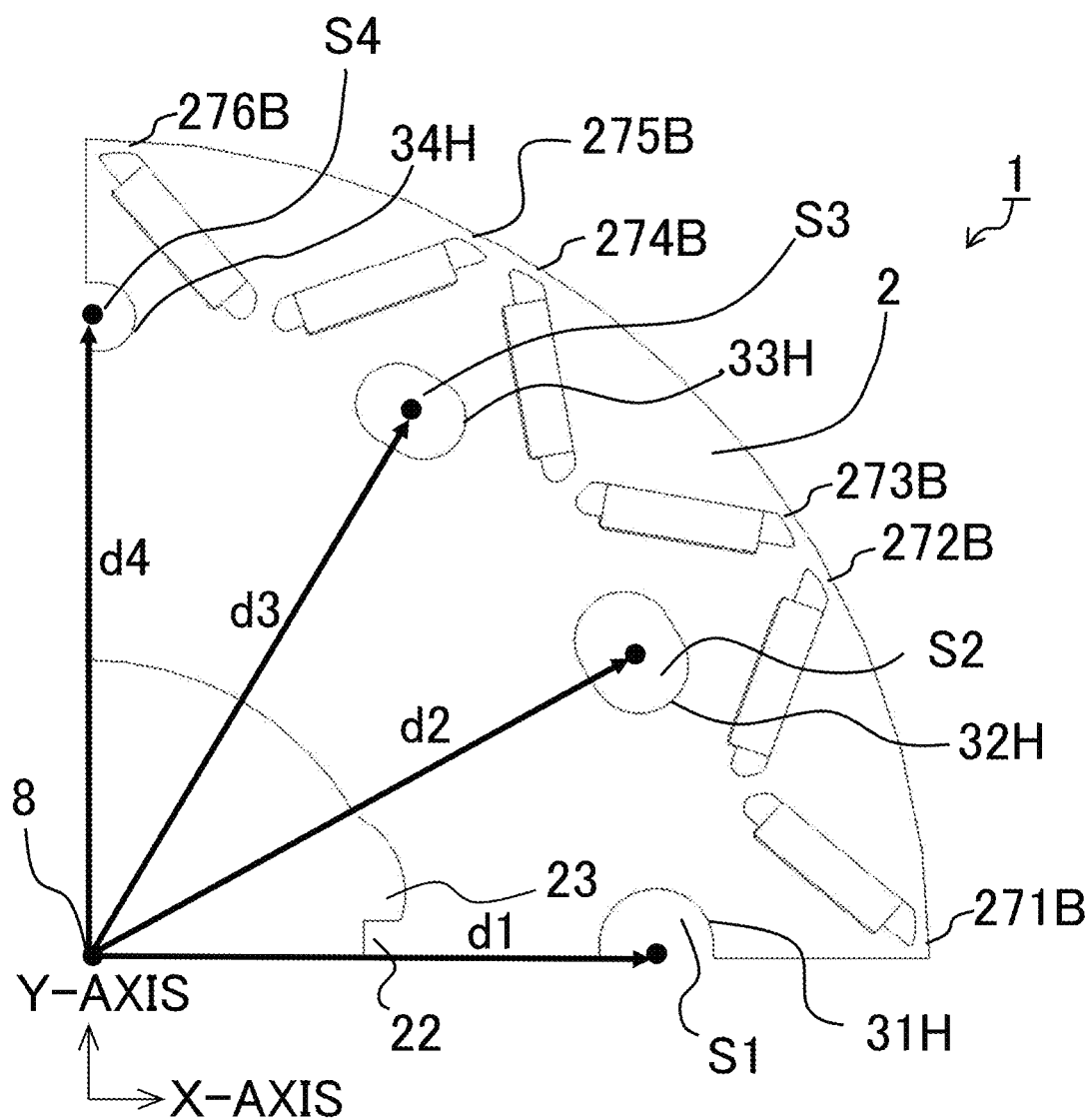
FIG. 16A is a plan view showing a one-quarter region of the rotor of the rotating electrical machine according to the second embodiment.
Figure 16B:
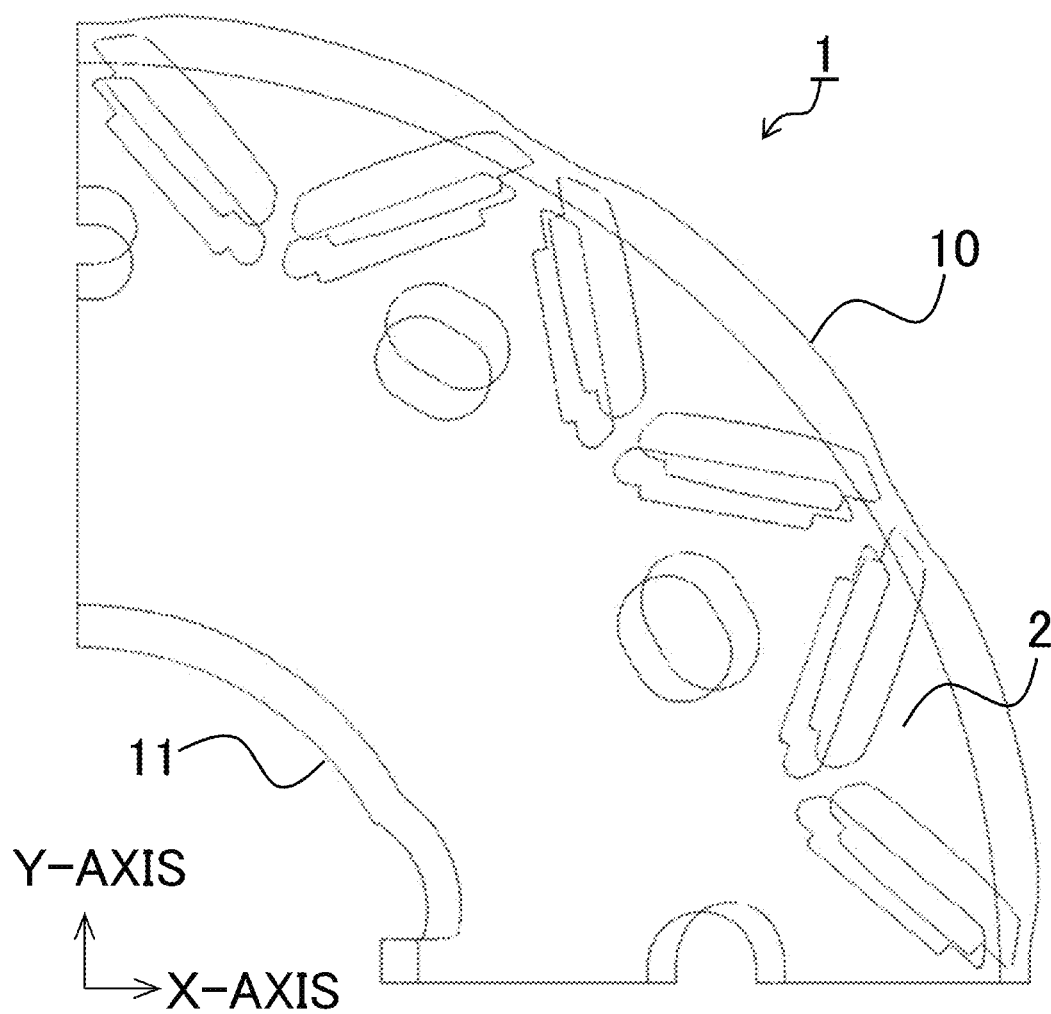
FIG. 16B is a plan view showing a distorted state of the rotor shown in FIG. 16A when rotating.

FIG. 16A is a plan view showing a one-quarter region of the rotor of the rotating electrical machine according to the second embodiment, and FIG. 16B is a plan view showing a distorted state of the rotor shown in FIG. 16A when rotating.

In FIG. 16A, the rotor according to the second embodiment includes the permanent magnet 3 embedded in the rotor core 2, the key portion 22, the stress relaxing groove 23, and the non-uniform balancing holes 31H, 32H, 33H, and 34H. That is, the straight lines d1, d2, d3, and d4 and the areas S1, S2, S3, and S4 of the non-uniform balancing holes 31H, 32H, 33H, and 34H are in the relationships of Expressions (3), (2), and (9).

$$d4 > d3 > d2 > d1 \qquad (3)$$

$$d4 > d1 \qquad (2)$$

$$S4 \leq S3 \leq S2 \leq S1 \qquad (9)$$

Also, FIG. 16B shows a distorted state of the rotor shown in FIG. 16A when rotating, and more specifically, shows a state wherein the initial outline 11 of the rotor core 2 and the distorted outline 10 of the rotor core 2 when the rotor 1 is caused to rotate at 13,000 rpm are enlarged by 200 times. The direction in which the key portion 22 is attached is the x-axis, and the direction perpendicular to the x-axis is the y-axis. FIG. 16A and FIG. 16B are symmetrical across the x-axis and the y-axis.

Herein, stress in the second embodiment and in the first comparative example, the second comparative example, and the first embodiment, and radial direction contact force in the second embodiment and in the third comparative example, the fourth comparative example, and the first embodiment, will be compared.

FIG. 17A is a drawing that compares a maximum stress acting on each of the outer peripheral bridge portions 271B to 276B in the rotor of the rotating electrical machine according to the second embodiment and in the rotor of the first comparative example, the second comparative example, and the first embodiment, and a standard deviation thereof. Also, FIG. 17B is a drawing that compares a radial direction contact force between the rotor core 2 and the shaft 4 in the rotor of the rotating electrical machine according to the second embodiment and in the rotor of the third comparative example, the fourth comparative example, and the first embodiment.

As shown in FIG. 17A, the maximum stress in the rotor 1 of the rotating electrical machine 100 according to the second embodiment drops below the maximum stress in the second comparative example in the outer peripheral bridge portions. Also, the standard deviation of the maximum stress acting on the outer peripheral bridge portions 271B to 276B drops below that in the first comparative example, the second comparative example, and the first embodiment.

That is, it can be seen that the rotor 1 of the rotating electrical machine 100 according to the second embodiment is such that by not only configuring in such a way that the installation positions of the balancing holes 31H, 32H, 33H, and 34H are non-uniform, but also configuring in such a way that the areas of the balancing holes 31H, 32H, 33H, and 34H are non-uniform, stress unevenness is restricted further than in the first embodiment, and the rotor 1 is a rotor with high durability. Also, when focusing on radial direction contact force, that in the rotor 1 of the rotating electrical machine 100 according to the second embodiment exceeds that in the third comparative example, and is of the same extent as that in the fourth comparative example and the first embodiment. That is, the rotor 1 of the rotating electrical machine 100 according to the second embodiment is such that torque transmitted between the rotor core 2 and the shaft 4 can be maintained at the same extent as, or greater than, that in the third comparative example and the fourth comparative example.

Because of this, the second embodiment can provide the rotating electrical machine 100 wherein unevenness of stress in the outer peripheral bridge portions 271B to 276B is eliminated, and holding torque between the rotor core 2 and the shaft 4 can be kept high.

As heretofore described, the rotating electrical machine 100 according to the second embodiment is characterized by including, in the same way as the rotating electrical machine according to the first embodiment, the stator 7 and the rotor 1, which has the rotor core 2 disposed on the inner side of the stator 7, the key portion 22 formed protruding in the radial direction from the inner peripheral face of the rotor core 2, the stress relaxing groove 23, which is provided at both ends of the key portion 22 and is formed recessed farther to the radial direction outer side than the inner peripheral face of the rotor core 2, and the multiple of balancing holes 31H, 32H, 33H, and 34H provided one each between each pair of the multiple of magnetic poles of the rotor core 2, wherein lengths from the center of the rotor core 2 to the center of each of the multiple of balancing holes 31H, 32H, 33H, and 34H are such that the length of the first straight line d1, which passes through the center of the key portion 22, is less than the length of the nth straight line dn that intersects with the first straight line d1 vertically (note that natural number n>1).

Furthermore, the rotating electrical machine 100 according to the second embodiment is characterized in that when a first straight line as far as the center of the balancing hole 31H on the half-line that passes through the center of the key portion 22, with the center of the rotor core 2 as the starting point 8, is defined as d1, an nth straight line as far as the center of the balancing hole 34H on a half-line that intersects with the first straight line d1 vertically, with the center of the rotor core 2 as the starting point 8, is defined as dn, the area of the balancing hole 31H on d1, which is the first straight line, is defined as S1, and areas neighboring in the circumferential direction as far as the balancing hole 34H on dn, which is the nth straight line, are defined in order as S2, S3, and so on to Sn, S1 to Sn satisfy Expression (10).

$$Sn \leq Sn-1 \leq \ldots \leq S1 \quad (10)$$

The rotating electrical machine 100 according to the second embodiment is such that when the key portion 22, and the stress relaxing groove 23 at both ends of the key portion 22, are provided on the inner periphery of the rotor core 2, the area of contact between the rotor core 2 and the shaft 4 is secured, and separation of the two is prevented, by not standardizing the positions or forms of the balancing holes 31H, 32H, 33H, and 34H provided between the magnetic poles, and distortion imbalance and stress imbalance of the rotor core 2 caused by the key portion 22 and the stress relaxing groove 23 can be efficiently restricted, whereby the rotating electrical machine 100 with increased durability can be provided.

Although the present application is described above in terms of various exemplifying embodiments and implementations, it should be understood that the various features, aspects, and functions described in one or more of the individual embodiments are not limited in their applicability to the particular embodiment with which they are described, but instead can be applied, alone or in various combinations, to one or more other embodiments.

It is therefore understood that numerous modifications that have not been exemplified can be devised without departing from the scope of the present application. For example, at least one constituent component may be modified, added, or eliminated. At least one of the constituent components mentioned in at least one of the preferred embodiments may be selected and combined with the constituent components mentioned in another preferred embodiment.

REFERENCE SIGNS LIST 1 rotor, 2 rotor core, 3 permanent magnet, 4 shaft, 5 stator core, 6 coil, 7 stator, 8 starting point, 10 distorted outline, 11 initial outline, 21 magnet insertion hole, 22 key portion, 23 stress relaxing groove, 221 key side face, 23R1 first arc, 23R2 second arc, 24 balancing groove, 26d sectional area, 31 balancing hole, 31H, 32H, 33H, 34H balancing hole, 311L first balancing hole central line, 312L second balancing hole central line, 313L third balancing hole central line, 314L fourth balancing hole central line, 271 outer peripheral bridge portion, 271B to 276B outer peripheral bridge portion, 41 key groove portion, 100 rotating electrical machine

The invention claimed is:

1. A rotating electrical machine, comprising:
a stator; and
a rotor having a rotor core disposed on an inner side of the stator, a key portion formed protruding in a radial direction from an inner peripheral face of the rotor core and provided in two places opposed at 180°, a stress relaxing groove, which is provided at both ends of the key portion and is formed recessed farther to a radial direction outer side than the inner peripheral face of the rotor core, and a multiple of balancing holes provided one each between each pair of a multiple of magnetic poles of the rotor core, wherein
a length from a center of the balancing hole disposed on a first straight line that passes through a center of the rotor core and a center of the key portion to the center of the rotor core is less than a length from the center of the rotor core to the center of the balancing hole disposed on a straight line that intersects with the first straight line vertically.

2. The rotating electrical machine according to claim 1, wherein, when
the first straight line as far as the center of the balancing hole on a half-line that passes through the center of the key portion, with the center of the rotor core as a starting point, is defined as d1,
an nth straight line (note that natural number n>1) as far as the center of the balancing hole on a half-line that intersects with the first straight line vertically, with the center of the rotor core as a starting point, is defined as dn, and
straight lines as far as the centers of the balancing holes between each pair of the multiple of magnetic poles sandwiched in a circumferential direction between the balancing hole on the first straight line and the balancing hole on the nth straight line, with the center of the rotor core as the starting point, are defined as d2, . . . in order from the nearest to the balancing hole on the first straight line, d1 to dn satisfy dn≥dn−1≥ . . . ≥d1.

3. The rotating electrical machine according to claim 2, wherein, when
an area of the balancing hole on the first straight line is defined as S1, and areas neighboring in the circumferential direction as far as the balancing hole on the nth straight line are defined in order as S2, S3, and so on to Sn, S1 to Sn satisfy Sn≤Sn−1≤ . . . ≤S1.

4. The rotating electrical machine according to claim 3, wherein
a multiple of permanent magnets are embedded in the rotor core, and
two of the permanent magnets are disposed in a V-shape in one magnetic pole.

5. The rotating electrical machine according to claim 3, wherein
a shaft fitted by press fitting is provided in the rotor core.

6. The rotating electrical machine according to claim 2, wherein
a multiple of permanent magnets are embedded in the rotor core, and
two of the permanent magnets are disposed in a V-shape in one magnetic pole.

7. The rotating electrical machine according to claim 2, wherein
a shaft fitted by press fitting is provided in the rotor core.

8. The rotating electrical machine according to claim 1, wherein
   a multiple of permanent magnets are embedded in the rotor core, and
   two of the permanent magnets are disposed in a V-shape in one magnetic pole.

9. The rotating electrical machine according to claim 8, wherein
   a shaft fitted by press fitting is provided in the rotor core.

10. The rotating electrical machine according to claim 1, wherein
   a shaft fitted by press fitting is provided in the rotor core.

\* \* \* \* \*